(12) United States Patent
Verkruyse et al.

(10) Patent No.: US 12,339,839 B2
(45) Date of Patent: Jun. 24, 2025

(54) ACCURACY AND PROVIDING EXPLAINABILITY AND TRANSPARENCY FOR QUERY RESPONSE USING MACHINE LEARNING MODELS

(71) Applicant: Data Squared USA Inc., Wilmington, DE (US)

(72) Inventors: Michael August Verkruyse, Enumclaw, WA (US); Jeffrey James Dalgliesh, Duncan (CA); Jon Travis Brewton, Pasadena, TX (US); Alexander Elkholy, Seattle, WA (US); Ashmita Mittal, Vancouver (CA)

(73) Assignee: Data Squared USA Inc., Wilmington, DE (US)

( * ) Notice: Subject to any disclaimer, the term of this patent is extended or adjusted under 35 U.S.C. 154(b) by 0 days.

(21) Appl. No.: 18/935,017

(22) Filed: Nov. 1, 2024

(65) Prior Publication Data

US 2025/0147957 A1    May 8, 2025

Related U.S. Application Data

(60) Provisional application No. 63/547,840, filed on Nov. 8, 2023.

(51) Int. Cl.
*G06F 16/2452* (2019.01)
*G06F 16/28* (2019.01)

(52) U.S. Cl.
CPC ...... *G06F 16/24522* (2019.01); *G06F 16/288* (2019.01)

(58) Field of Classification Search
CPC .......................... G06F 16/24522; G06F 16/288
See application file for complete search history.

(56) References Cited

U.S. PATENT DOCUMENTS

| | | | |
|---|---|---|---|
| 10,606,899 B2* | 3/2020 | Dole | G06F 16/90335 |
| 10,841,404 B2* | 11/2020 | Howard | H04L 67/75 |
| 12,039,263 B1* | 7/2024 | Mondlock | G06F 40/20 |
| 12,204,524 B1* | 1/2025 | Birru | G06F 16/2365 |
| 2009/0125498 A1* | 5/2009 | Cao | G06F 16/951 |
| | | | 707/999.005 |
| 2012/0077178 A1* | 3/2012 | Bagchi | G09B 7/00 |
| | | | 434/362 |
| 2019/0188332 A1* | 6/2019 | Ingvaldsen | G06F 16/9024 |

(Continued)

OTHER PUBLICATIONS

Yadav et al., VEKG: Video Event Knowledge Graph to Represent Video Streams for Complex Event Pattern Matching, 2019 First International Conference on Graph Computing (GC), whole document (Year: 2019).*

(Continued)

*Primary Examiner* — Sonia L Gay
(74) *Attorney, Agent, or Firm* — Perkins Cole LLP

(57) ABSTRACT

The implementations herein disclose advanced systems and methods for integrating, analyzing, and reasoning over heterogeneous data at scale. In some implementations, the system comprises a synergistic data processing infrastructure featuring: a graph database core for unified data representation; specialized loaders for concurrent ingestion and processing of structured, unstructured, and time series data; a natural language reasoning engine leveraging large language models; and a multi-modal user interface.

19 Claims, 10 Drawing Sheets

(56) References Cited

U.S. PATENT DOCUMENTS

| | | | | |
|---|---|---|---|---|
| 2021/0026859 | A1* | 1/2021 | Vangala | G06F 16/24578 |
| 2021/0256097 | A1* | 8/2021 | Jayaraman | G06N 5/046 |
| 2021/0357443 | A1* | 11/2021 | Rawat | G06N 20/00 |
| 2022/0343183 | A1* | 10/2022 | Ma | G06F 16/21 |
| 2023/0169361 | A1* | 6/2023 | Mitra | G06N 3/006 |
| | | | | 706/12 |
| 2023/0274089 | A1* | 8/2023 | Tunstall-Pedoe | G06F 40/40 |
| | | | | 704/2 |
| 2024/0192847 | A1* | 6/2024 | Chawla | G06F 3/0604 |
| 2024/0311348 | A1* | 9/2024 | Lutz | G06F 16/258 |
| 2024/0362208 | A1* | 10/2024 | Naufel | G06N 20/00 |
| 2024/0419912 | A1* | 12/2024 | Somech | G06F 40/279 |

OTHER PUBLICATIONS

Carta et al., Iterative Zero-Shot LLM Prompting for Knowledge Graph Construction, 2023, arXiv, whole document (Year: 2023).*

Doroddnykh et al., Knowledge Graph Engineering Based on Semantic Annotation Knowledge Graph Engineering Based on Semantic Annotation, 2023, MDPI, whole document (Year: 2023).*

Gkatzia et al., Content Selection in Data-to-Text Systems: A Survey, 2016, arXiv, whole document (Year: 2016).*

Hosseini et al., Deep text clustering using stacked Auto Encoder, 2022, Multimedia Tools and Applications, whole document (Year: 2022).*

Nirebo-GArcia et al., A novel application of machine learning and zero-shot classification methods for automated abstract screening in systematic reviews, 2023, Elsevier, whole document (Year: 2023).*

Wang et al, Knowledge Graph-Embedded Time-Serial-Data-Driven Bottleneck Analysis of Textile and Apparel Production Processes, 2023, MDPI, whole document (Year: 2023).*

* cited by examiner

ACCURACY AND PROVIDING EXPLAINABILITY AND TRANSPARENCY FOR QUERY RESPONSE USING MACHINE LEARNING MODELS

PRIORITY

The present application claims the benefit under 35 U.S.C. § 119 (e) of U.S. Provisional Application No. 63/547,840, filed Nov. 8, 2023, each of which is hereby incorporated herein by reference in its entirety under 37 C.F.R. § 1.57. Any and all applications for which a foreign or domestic priority claim is identified in the Application Data Sheet as filed with the present application are hereby incorporated by reference under 37 C.F.R. § 1.57.

BACKGROUND

In the digital age, a common problem that plagues individuals, businesses, and government agencies alike is data overload. The sheer volume of data generated daily, coupled with the disparate sources from which this data originates, makes managing data increasingly difficult to manage and extract meaningful insights. This overwhelming influx of information can be likened to finding a needle in a haystack, where valuable data is often buried under a mountain of irrelevant or redundant information.

Current data management systems often fall short in addressing the complexities associated with data overload. Traditional methods of data collection, organization, and analysis are typically fragmented and lack the integration necessary to provide a comprehensive understanding of the data landscape. These systems may offer basic data visualization and reporting tools, but existing systems do not possess the advanced capabilities required to extract deeper insights or provide actionable recommendations.

Thus, there is a pressing need for an integrated system that can seamlessly gather, process, and analyze data from various sources, transforming it into a coherent and actionable knowledge framework. Such a system should not only organize data but also enrich it with advanced analytical techniques, visualize complex data structures in an intuitive manner, and provide intelligent advice based on continuous learning and adaptation.

BRIEF DESCRIPTION OF THE DRAWINGS

Detailed descriptions of implementations of the present invention will be described and explained through the use of the accompanying drawings.

Figure 1:
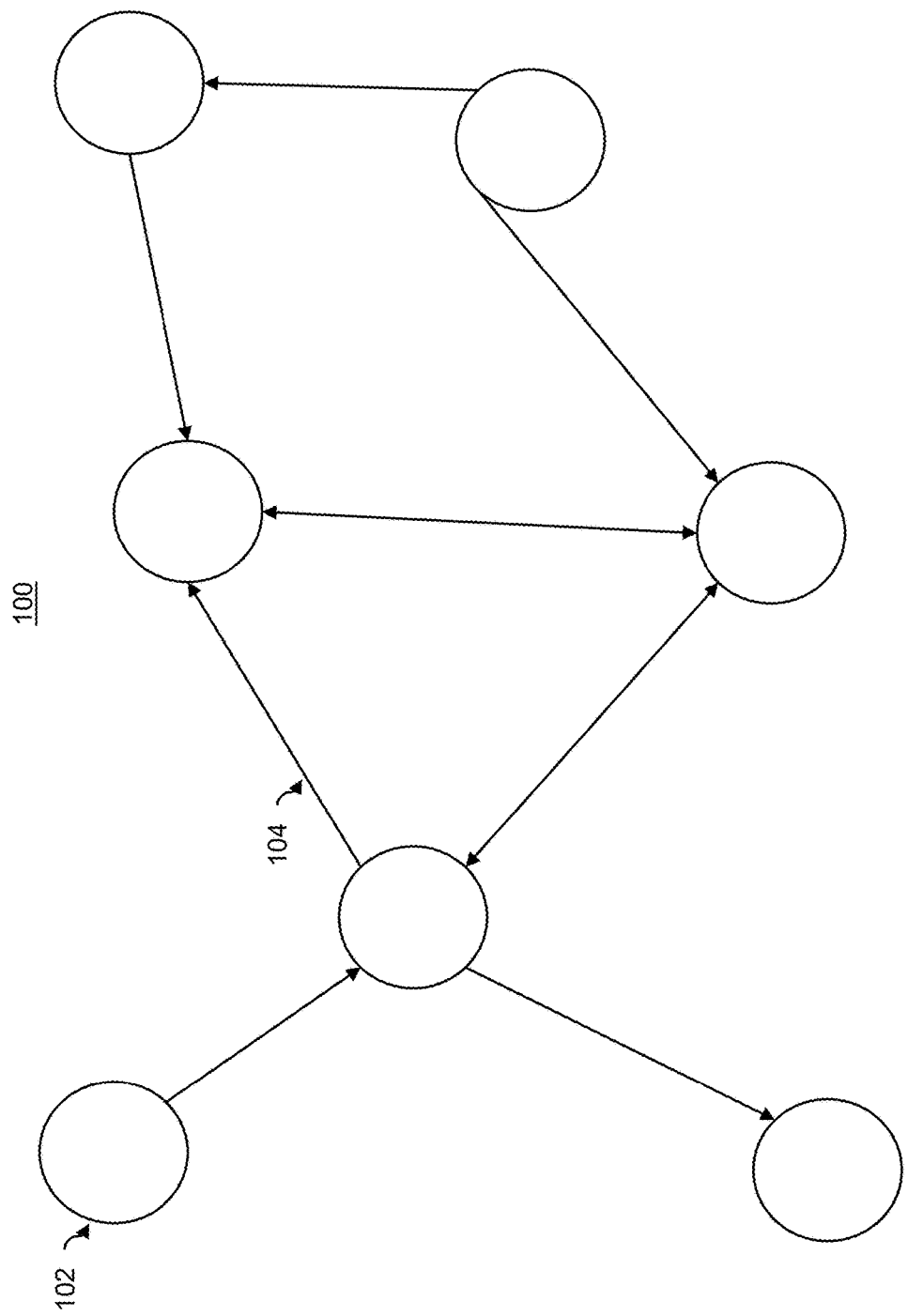
FIG. 1 illustrates an example graph representation according to some implementations herein.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Introduction and Exemplary Advantages

Existing systems for managing, querying, and generating responses related to interconnected data often face significant challenges that limit their effectiveness and efficiency. For example, traditional relational databases, which are designed to handle structured data in tabular formats, struggle with the inherent complexity and dynamic nature of relationships in graph data. These systems are not optimized for traversing relationships, leading to performance bottlenecks when dealing with large-scale, highly connected datasets. As a result, queries that involve multiple joins or deep relationship traversals can become prohibitively slow, impacting the overall performance and scalability of the system.

Moreover, traditional databases lack robust mechanisms for semantic understanding, which is crucial for deriving meaningful insights from interconnected data. Without semantic context, existing systems cannot interpret the relationships and interactions between different data points accurately. The absence of semantic capabilities also makes it difficult to integrate data from diverse sources, as there is no standardized way to represent and understand the meaning and context of the data.

Data integration from multiple diverse sources is also a drawback of existing systems. Inconsistent data formats, varying data structures, and conflicting information can result in data quality issues, such as duplicates, inaccuracies, and incomplete records. These issues complicate the process of creating a unified view of the data, which is necessary for comprehensive analysis and decision-making. Traditional databases often require extensive data cleaning and transformation efforts to address these inconsistencies, adding to the complexity and cost of data integration projects.

Furthermore, the rigid schemas of conventional databases restrict their ability to adapt to new data types and relationships over time. As organizations evolve and new data sources emerge, the need to accommodate additional data types and relationships becomes critical. However, making schema changes in traditional databases can be a cumbersome and error-prone process, requiring significant downtime and manual intervention. This lack of flexibility hinders the ability to quickly respond to changing business requirements and limits the system's long-term viability.

These deficiencies highlight the need for a more advanced solution that can seamlessly handle the intricacies of graph data, ensure data consistency and integrity, and provide rich, context-aware querying capabilities. The disclosed system addresses these challenges by integrating a semantic graph database with a flexible graph schema and advanced data ingestion capabilities. The system therefore comprises a powerful framework for managing and analyzing complex data relationships, enabling efficient data traversal, semantic understanding, and seamless data integration for query response.

The implementations herein generally relate to systems and methods that utilize artificial intelligence (AI), machine learning (ML), and/or large language models (LLMs) to make sense of the vast amounts of data in the world, to connect the dots, and provide insights that lead to better decisions. In some implementations, the system aggregates disparate sources of data to identify and extract relevant information and context to visually display the connections and relationships between assets and evidence via an intuitive user interface (UI), which may comprise a graphical user interface (GUI). The system's data fusion functionality enables a complete and holistic view of an operating environment and reveals previously unidentified correlations and hidden connections data. Ultimately, the system reduces operating risk, optimizes the efficiency of the organization, and enables users to make better, more informed decisions. The system comprises a synergistic data processing infrastructure that harmoniously combines multiple advanced components to create a unified, intelligent system capable of ingesting, processing, and deriving insights from diverse data modalities.

To enable synthesis and actionable visualization of vast amounts of disparate structured and unstructured data, the system focuses on at least the following areas of functionality, among others: the system gathers data from various sources and organizes the data into a visualized knowledge framework. This interconnected approach provides a 360-degree view of all available data, regardless of the scale of the data. In some implementations, the system employs advanced natural language processing (NLP) techniques and LLMs to extract deeper meanings, correlations, and insights from the raw data. Machine learning ensures the quality of insights improves over time. In some implementations, the system also comprises advanced visualization tools that make complex data structures understandable to users. In some implementations, the system comprises reasoning features that leverage machine learning, graph data science, and artificial reasoning techniques to provide insights and actionable recommendations that evolve and adapt over time.

As such, the implementations herein disclose advanced systems and methods for integrating, analyzing, visualizing, and reasoning over heterogeneous data at scale. In some implementations, the system comprises a synergistic data processing infrastructure comprising, for example, a graph database core for unified data representation; specialized loaders for concurrent ingestion and processing of structured, unstructured, and time-series data; a natural language reasoning engine leveraging large language models; and a multi-modal user interface including a GUI. The system employs advanced machine learning techniques to transform raw data into rich, interconnected graph representations, which may communicate with each other and synchronize in real-time. The natural language reasoning engine executes complex queries using hybrid symbolic-neural approaches, generating responses with granular source citations and confidence scores. This integrated approach enables sophisticated multi-modal reasoning tasks that transcend individual algorithmic capabilities, closely approximating human-level understanding across diverse domains and data types. The invention's modular, microservices-based architecture ensures scalability, flexibility, and robustness in various deployment scenarios.

In some implementations, the graph database core refers to the underlying architecture and technology of a graph database that enables the storage, retrieval, and management of data in the form of nodes (entities) and edges (relationships) in graph representations. FIG. 1 illustrates an example graph representation according to some implementations herein. In some implementations, the graph representation 100 comprises a plurality of nodes 102 and a plurality of edges 104 between nodes 102. The graph representation comprises a structured representation of information that captures relationships, represented by edges 104, between entities, represented by nodes 102, in a way that is both human-readable and machine-interpretable. Nodes 102 represent the entities or concepts (e.g., evidence related to an entity) within the graph representation 100. Each node 102 typically corresponds to a real-world object, concept, or data point, including, for examples, people, places, organizations, objects, and/or events, or evidence about those entities, among others. Edges 104 represent the relationships or connections between nodes 102. Each edge has a unilateral or bilateral direction (from one node to another) and a label that describes the nature of the relationship. For example, a "located in" relationship may connect a node 102 representing an organization to a node representing a place, indicating that the organization is located in the place. Both nodes 102 and edges 104 may also comprise properties, which are additional pieces of information that provide more context about the entity or relationship, such as names, addresses, industries, dates, and/or positions, among others. In some implementations, labels may also be used to categorize nodes 102 and edges 104 in the graph representation 100. A node 102 or edge 104 can have one or more labels that help in identifying the type of entity or relationship.

Utilizing a pathfinding algorithm, the system expands and collects nodes up to "n" degrees away, building a pathway that includes relevant entities connected to the malware and IP address. After applying a security filter based on the user's clearance, the system returns a sanitized subset of nodes, enabling the user to reason locally over a comprehensive but classification-compliant dataset, thereby contextualizing the suspect's connections and entities related to the malware network.

The core may be designed to handle complex, interconnected data efficiently, such that the core represents data in a way that mirrors real-world relationships and interactions. In some implementations, the database core may comprise the various engines, such as the natural language reasoning engine, query processing, indexing, and other fundamental components. As noted above, the graph database core provides a unified data representation, such that graph database core can integrate and represent data from various sources and formats in a single, cohesive graph structure. This unification allows for seamless querying and analysis across different types of data. In some implementations, the graph database core comprises a semantic graph database with a graph schema that defines the structure of the data within the semantic graph database. For example, the schema may specify the types of nodes, the types of relationships between nodes, and the properties (attributes) that nodes and relationships may comprise. Thus, the graph schema provides a framework for how data is organized and ensures consistency and integrity within the graph database. In some implementations, the graph schema can also enforce rules and constraints on the data to maintain its quality and coherence.

In some implementations, as noted above, the system comprises a semantic graph database, serving as the central repository for a unified data representation. This graph database, which may be implemented either through a purpose-built graph database management system or as a semantic layer atop a relational database, may form a foundation upon which the system's advanced capabilities are built. The system's data ingestion and processing capabilities may be realized through a triad of specialized data loaders: a structured data loader, engineered to ingest and process tabular data from various sources, employing advanced schema inference, mapping, and entity resolution techniques; an unstructured data loader, leveraging advanced large language models to extract structured information from free-form text, documents, and images. In some implementations, the system comprises a time series data loader, designed to handle sequential data points, incorporating sophisticated temporal resampling, pattern recognition, and multi-scale representation techniques.

These loaders operate concurrently, enabling the system to process diverse data types simultaneously and integrate them into the unified graph representation. In some implementations, the system also comprises a natural language reasoning engine, which executes complex queries against the unified graph representation. This engine employs hybrid symbolic-neural approaches, combining the pattern matching capabilities of LLMs with the structured reasoning facilitated by the graph database. The engine generates responses with granular source citations and confidence scores, ensuring transparency and verifiability of the system's outputs. The synergistic integration of these algorithmic components yields capabilities that transcend the sum of their individual parts including, for example, cross-modal data enrichment, dynamically linking entities and relationships across disparate data modalities, an adaptive knowledge representation, evolving the graph schema based on incoming data and user interactions, multi-scale temporal-semantic reasoning, seamlessly integrating time series patterns with semantic knowledge, holistic hallucination mitigation through cross-validation across data sources and modalities, and continuous learning and refinement mechanisms propagating improvements across all system components. Various advantages of these capabilities are described below.

This integrated approach enables the system to perform sophisticated multimodal reasoning tasks that closely approximate human-level understanding across diverse domains and data types. Furthermore, the system's modular, microservices-based architecture ensures scalability, flexibility, and robustness across various deployment scenarios, including on-premises, cloud, and hybrid infrastructures.

In some implementations, the system further comprises a multi-modal user interface, featuring interactive graph visualization, comprehensive data provenance tracking, and intuitive natural language query capabilities. This interface facilitates user interaction with the complex underlying data structures and reasoning processes, enhancing interpretability and user trust. In summary, the system comprises a comprehensive solution for integrating and analyzing heterogeneous data at scale.

The system provides various advantages over existing solutions including, for example, cross-modal data enrichment through dynamic linking of entities and relationships across disparate data modalities.

Cross-modal data enrichment refers to the process of integrating and enhancing data from different modalities (e.g., text, images, audio, video, or structured data) by dynamically linking entities and relationships across these diverse sources. Existing solutions are often siloed and static, handling only specific data types (e.g., text-only or image-only) or lacking the ability to provide continuous automated updates, leading to incomplete or fragment analysis. In contrast, the implementations herein may leverage advanced techniques in data integration, NLP, ML, and AI to create a unified and enriched dataset that provides deeper insights and more comprehensive understanding of the dataset. Cross-modal data enrichment may comprise identifying and extracting entities (e.g., people, places, organizations) from different data modalities, connecting these entities across different data sources to create a cohesive knowledge graph, identifying, extracting, and continuously updating relationships between entities within and across different data modalities, and/or enhancing the dataset by adding contextual information and insights derived from the integrated data.

Additionally, in some implementations, the system may implement an adaptive knowledge representation, evolving the graph schema based on incoming data and user interactions. Existing Systems often rely on static schemas that require manual updates and reconfiguration to accommodate new data types and relationships. In contrast, the adaptive knowledge representation allows the graph schema to be modified and/or evolve its structure and content based on new data and user interactions. In this way, the graph schema is not static but can change over time to better reflect the evolving nature of the data and the ways users interact with the data. In some implementations, functionally, this means that new nodes, edges, and properties can be added, and existing ones can be modified or removed adaptively and automatically by the system. For example, if a data source comprises a social network that starts to include new types of interactions (e.g., reactions like "love" or "hate"), the schema can evolve to include these new types of relationships and properties. In some implementations, the system uses ML/AI to automatically detect patterns and trends in the incoming data and user interactions to automatically suggest or implement changes to the schema. For instance, if the system detects that users frequently search for a specific type of relationship between entities that is not currently represented by the graph schema, the system can adapt the schema to include this relationship. Furthermore, users can provide feedback or directly interact with the system to suggest changes to the schema. This can be achieved through explicit actions (e.g., adding a new type of node) or implicit actions (e.g., frequently querying certain types of data). As such, the system can adapt to new requirements and changes in the data landscape without requiring extensive manual reconfiguration. Advantageously, by continuously evolving, the system can uncover new patterns and relationships that static schemas might miss, such as negative relationships. Thus, while existing system may struggle to scale effectively as the volume and complexity of data increase, the implementations herein may be designed to handle large-scale data integration and analysis, making them more scalable and efficient in managing complex data landscapes.

In some implementations, another advantage of the system is multi-scale temporal-semantic reasoning, seamlessly integrating time series patterns with semantic knowledge. This approach seamlessly integrates time series patterns with semantic knowledge, enabling a comprehensive and dynamic understanding of data. As noted above, traditional systems often rely on static schemas and manual updates, which can be time-consuming and prone to errors. In contrast, multi-scale temporal-semantic reasoning dynamically evolves the data schema based on incoming data and user interactions.

In some implementations, temporal pattern analysis may be used to identify and analyze patterns in data over various time scales, such as short-term trends, seasonal variations, and long-term changes. For example, in a healthcare application, this could involve analyzing daily vital signs, monthly lab results, and yearly medical history. Additionally, semantic knowledge integration incorporates contextual information, such as meanings, relationships, and contexts, into the analysis. As such, the system may understand the significance and implications of the temporal patterns. For instance, integrating medical research articles and treatment guidelines with patient health data provides a richer context for interpreting health trends. Multi-scale reasoning combines insights from different time scales and semantic contexts to provide a holistic understanding of the data. This is particularly useful in complex scenarios where short-term fluctuations need to be understood in the context of long-term trends and broader semantic knowledge. Additionally, the system may be configured for dynamic adaptation, continuously updating, and refining the analysis as new data and semantic information become available. This ensures that the insights remain current and relevant, adapting to new developments and user interactions.

In some implementations, this approach offers a comprehensive analysis by combining temporal patterns with semantic knowledge, leading to deeper and more nuanced insights than existing solutions can provide. The integration of contextual information enhances the accuracy and relevance of the insights, making those insights more actionable.

Another innovation of the system described herein is holistic hallucination mitigation through cross-validation across data sources and modalities. As described above, existing systems often rely on single-source or single-modality data, which can be prone to errors and hallucinations. Hallucination in AI refers to the generation of information or insights that are not grounded in the input data, often leading to misleading or incorrect conclusions. These systems may also require significant manual effort to validate and corroborate the data, which can be time-consuming and error prone. In contrast, holistic hallucination mitigation through cross-validation automates the validation process, reducing manual effort and the potential for errors.

In some implementations, cross-validation across data sources ensures that the insights derived from one data source are corroborated by other independent sources. For example, in a healthcare application, patient health data from electronic health records can be cross validated with data from wearable devices and lab results. This multi-source validation helps to identify and mitigate any inconsistencies or anomalies that may arise from a single data source. Secondly, cross-validation across modalities involves integrating and validating data from different types of data modalities. This multi-modal approach ensures that the insights are not only consistent across different data types but also enriched by the diverse perspectives that each modality offers. For instance, in the healthcare application, textual data from patient records can be cross validated with imaging data from X-rays or MRIs, and audio data from patient interviews, providing a more comprehensive and accurate diagnosis. The benefits of this holistic approach are substantial. By leveraging cross-validation across multiple data sources and modalities, the system can significantly reduce the risk of hallucination, leading to enhanced accuracy and reliability of the results.

In some implementations, the system also comprises continuous learning and refinement mechanisms for propagating improvements across all system components. Traditional systems often rely on static models that do not adapt to new data or changing conditions, or use outdated learning techniques, leading to a decline in performance and relevance over time. In contrast, in some implementations, continuous learning allows the system to learn from new data and experiences continuously. As the system processes more data and receives feedback from users, it updates its algorithms and models to reflect the latest information and insights. For example, in the healthcare application, the system can continuously learn from new patient data, medical research, and treatment outcomes to improve diagnostic accuracy and treatment recommendations. Additionally, refinement mechanisms function such that that the improvements identified through continuous learning are propagated across all system components. As such, enhancements in one part of the system, such as improved pattern recognition in data analysis, are integrated into other components, such as decision-making algorithms and the user interface. The propagation of improvements across all system components ensures that the entire system evolves and improves over time, leading to a more robust and effective solution.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Although certain preferred implementations and examples are disclosed below, inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Data Processing System Architecture

Figure 2:
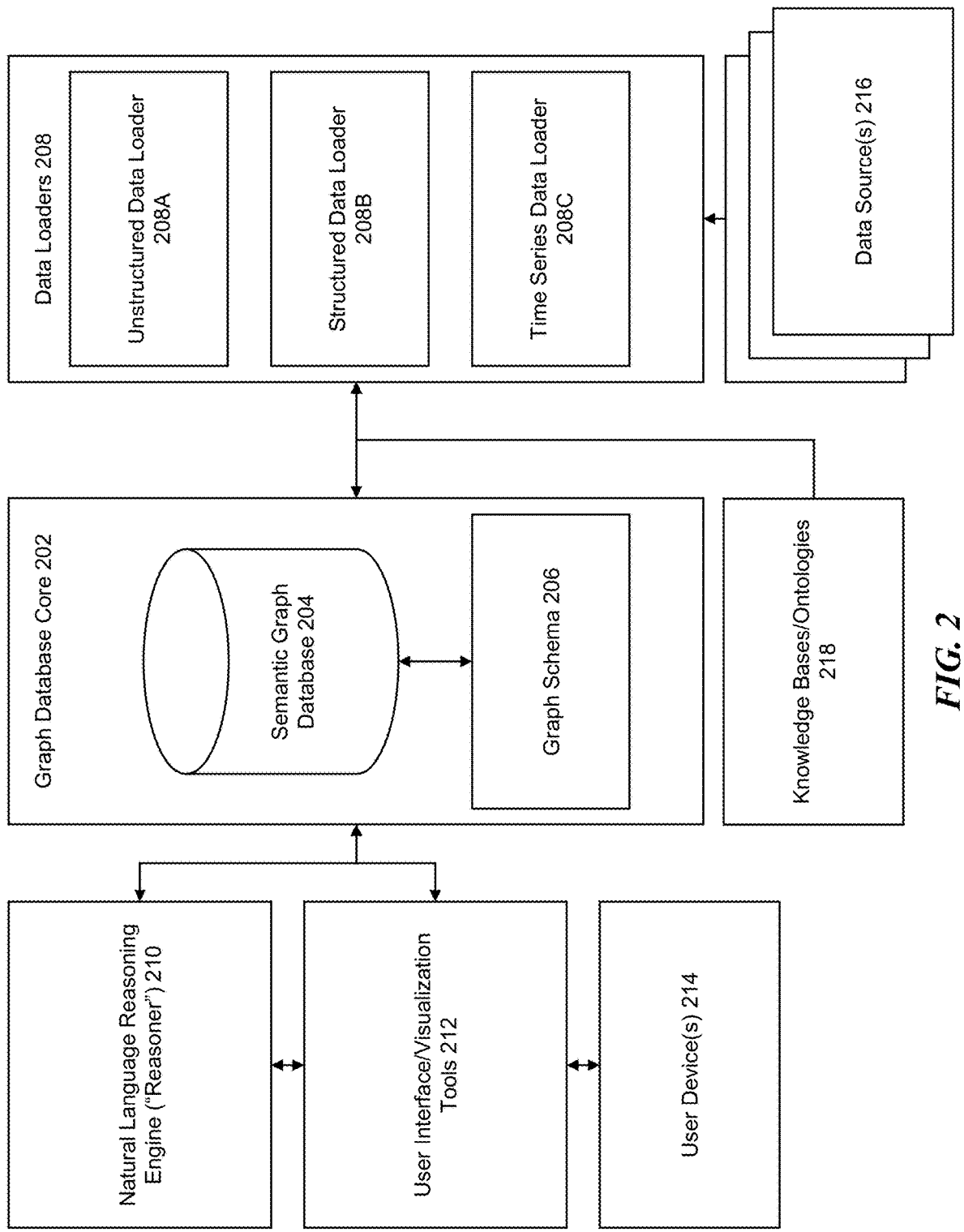
FIG. 2 illustrates a block diagram of an example data processing infrastructure according to some implementations.

In some implementations, the system comprises a data processing infrastructure configured to efficiently handle the ingestion, transformation, and storage of heterogeneous data types. This infrastructure is composed of several interconnected modules, each specialized for specific data processing tasks. FIG. 2 illustrates a block diagram of an example data processing infrastructure according to some implementations.

In some implementations, the system comprises an integrated semantic graph database 204 of the graph database core 202 as a critical component of its comprehensive data processing and analysis infrastructure. The integration and utilization of the semantic graph database 204 within the broader system architecture contributes significantly to the functionality of the implementations herein. In some implementations, the semantic graph database 204 is the primary data model, representing complex semantic relationships between data entities, concepts, and attributes. A graph schema 206 of the graph database core 202 defines the structure of the data within the semantic graph database 202. This architecture enables seamless integration of the semantic graph database within a larger ecosystem of data processing, analysis, and interaction components. This holistic approach enables sophisticated data integration, multimodal reasoning, and intuitive user interaction that transcends the capabilities of any single component, including the graph database in isolation. Furthermore, by leveraging the semantic graph database 204 as part of this larger system, the implementations herein facilitate advanced capabilities such as cross-modal data enrichment, adaptive knowledge representation, and multi-scale temporal-semantic reasoning, all of which contribute to its unique value proposition in the field of AI-powered data analysis and integration systems.

The system allows for flexible implementation of this semantic graph database 204 through various approaches. For example, utilization of existing purpose-built graph database management systems (e.g., Neo4j, ArangoDB, or Amazon Neptune, among others), or implementation of a semantic graph representation layer constructed atop traditional relational database management systems (RDBMS). This flexibility in implementations allows optimal deployment across various technological environments and organizational constraints, enhancing the system's adaptability and scalability.

The semantic graph database 204, regardless of its underlying implementation, may be intricately integrated with other system components, including, for example, specialized data loaders 208 for unstructured, structured, and time-series data, a sophisticated natural language reasoning engine 210, and advanced user interface and visualization tools 212 for display on user device(s) 214.

This integration enables the system to leverage the semantic graph database 204 for efficient storage and retrieval of complex, interconnected data, representation of domain-specific ontologies and knowledge structures, facilitation of inferential reasoning capabilities, and support for flexible schema evolution to accommodate dynamic data landscapes.

In implementations utilizing a purpose-built graph database, the system may judiciously supplement the graph database with a relational database component. This hybrid architecture optimally manages metadata and time-series data that may not be ideally suited for graph representation, ensuring comprehensive data management while maintaining the semantic richness of the core model.

As noted above, the system comprises one or more data loaders 208 for ingestion and/or processing of data from one or more data sources 216. The unstructured data loader 208A is a specialized module designed to ingest and process various forms of unstructured data, including but not limited to, free-form text, legal documents, medical records, personal notes, email messages, system logs, word processing documents (e.g., .docx files), and Portable Document Format (PDF) files, among other.

In some implementations, the unstructured data loader 208A employs an array of advanced techniques to extract meaningful data from unstructured sources and transform/normalize that data into a format suitable for integration into the semantic graph database 204. These techniques include NLP methods, although the unstructured data loader 208A is not limited to NLP alone. For example, the unstructured data loader 208A may utilize a comprehensive toolkit that includes rule-based algorithms (e.g., regular expressions, string manipulation), ML models (both supervised and unsupervised, such as XGBoost, random forest, and k-means clustering), and LLMs (either trained in-house or accessed via third-party APIs).

In some implementations, a structured data loader 208B is responsible for ingesting and processing tabular data from various sources, such as: RDBMS, comma-separated values (CSV) files, spreadsheet files (e.g., .xlsx), tab-separated values (TSV) files, and JavaScript Object Notation (JSON) files, among others. The structured data loader 208B comprises capabilities for schema inference, data type detection, and automatic normalization to ensure seamless integration of structured data into the semantic graph database 204.

In some implementations, a time series data loader 208C is configured to handle sequential data points indexed in time order. The time series data loader 208C is configured to process data from data sources 216 such as, but not limited to, industrial sensor readings, financial market data, environmental monitoring systems, biometric data streams, and network traffic logs, among. The time series data loader 208C comprises specialized algorithms for temporal data analysis, including capabilities for resampling, interpolation, and feature extraction from time-based signals.

In some implementations, a natural language reasoning engine 210, hereinafter referred to as the "Reasoner," comprises a sophisticated API that facilitates user interaction with the graph database core 202 through natural language queries. The natural language reasoning engine 210 leverages advanced ML and natural language understanding techniques to perform one or more of the following operations: parsing and interpreting natural language queries submitted by users via the user interface/visualization tools 212, translate queries into appropriate graph traversal or database query operations, execute the translated queries against the semantic graph database 204 and associated relational data stores, and/or synthesize and present the results in a human-readable format via the user interface/visualization tools 212.

In some implementations, the following features further characterize the Reasoner 210. In some implementations, the system implements a source citation mechanism for each statement the Reasoner 210 returns in response to a user query. In some implementations, the source citation mechanism is configured to identify and retrieve graph elements, such as specific nodes and edges, within the semantic graph database 204 that were traversed or accessed to generate the response. The Reasoner 210 may also extract metadata associated with the graph elements, including, but not limited to, the original data source, timestamps of data ingestion, and any relevant version information, The Reasoner 210 may compile this metadata into a structured citation format, which may be appended to or associated with each statement in the response.

In some implementations, the user interface/visualization tools 212 and the associated user experience component is a critical part of the system, providing an intuitive and informative interface for users to interact with the data processing infrastructure and reasoning engine. The UI is configured to enhance user understanding, facilitate data exploration, and ensure transparency in the AI/ML-driven insights.

In some implementations, a key feature of the UI is its ability to display data provenance information, ensuring transparency and traceability. For each data point or relationship stored in the semantic graph database 204, users can access, for example, the original file source, the algorithm or processing method used to extract or generate the data, an indication of whether the data was AI-generated or human-inputted, and/or a timestamp and/or version history of data modifications. This feature allows users to understand the origin and processing history of any data within the system.

In some implementations, the UI provides a user-friendly interface for interacting with the natural language reasoning engine 210. This interface comprises, for example, a text input field for entering natural language questions, auto-suggestion and query completion features, a history of previous queries for reference, and the capability to save and categorize frequently used queries.

In some implementations, the UI also comprises an interactive graph visualization tool that allows users to view and explore the structure of the semantic graph database 204, zoom in/out and pan across the graph, click on nodes to reveal detailed information, highlight connections and relationships between entities, and/or filter and search for specific nodes or relationships. The graph visualization provides users with a comprehensive overview of the data structure and relationships, facilitating intuitive navigation through complex data sets.

In some implementations, user may interact with the graph database core 202 and/or the Reasoner 210 through the UI/visualization tools 212 via queries. In some implementations, when the system provides an answer to a user query, the UI may display a clear presentation of the answer in natural language, a visual representation of the graph traversal or data points used to derive the answer, a highlighting of relevant nodes and edges in the graph visualization, and/or a mechanism for exploring specific data points for more detailed information.

As noted above, in some implementations, the system may comprise one or more features configured to address the challenge of AI hallucination and ensure result reliability. For example, the UI may comprise a hallucination quantification feature that provides a comparison of the query answer against known facts in the database and highlights any inconsistencies or potential hallucinations in the response. This feature provides users with a clear understanding of the reliability of AI-generated insights and allows users to make informed decisions based on the system's outputs.

In some implementations, the system is configured following a microservices architecture, with each major component (e.g., data loaders 208, semantic graph database 204, reasoning engine 210) implemented as a separate microservice. In this architectural style, the system comprises a collection of loosely coupled, independently deployable services/components. Each service/component is responsible for a specific piece of functionality and communicates with other services through, for example, well-defined APIs. This architecture provides several advantages. For example, the individual services/components can be scaled independently based on resource requirements. Furthermore, services/components can be updated or replaced without affecting the entire system. Similarly, failure in one service/component does not necessarily lead to system-wide failure. In some implementations, this architecture may be implemented by containerizing the services/components using a containerization platform, such as Docker, which automates the deployment, scaling, and management of the services/components, allowing for consistent deployment across various environments. Furthermore, a container orchestration platform such as Kubernetes may be employed, providing functionality such as automated deployment and scaling of microservices, load balancing, self-healing capabilities, and/or rolling updates and rollbacks. In some implementations, the microservices architecture allows for versatile system deployment options, including, for example, single-machine deployment for personal or small-scale use, on-premises server deployment for organizations with specific data security requirements, and/or cloud-based deployment, leveraging third-party cloud infrastructure providers for scalability and global accessibility. In cloud-based deployments, the system can be offered as a Software-as-a-Service (SaaS) solution, with APIs provided for remote data ingestion and querying.

Data Loading and Processing Algorithms

The structured data loading algorithms, herein referred to as the "Data Loaders" 208 is a sophisticated component of the data processing infrastructure designed to ingest, analyze, and integrate structured data from various data sources 216 into the semantic graph database 204. In some implementations, the data loaders 208 employ a combination of user-guided processes, AI/ML techniques, and customizable mapping strategies to transform unstructured, structured, and/or time series data into a rich, interconnected graph representation within the semantic graph database 204.

Figure 3:
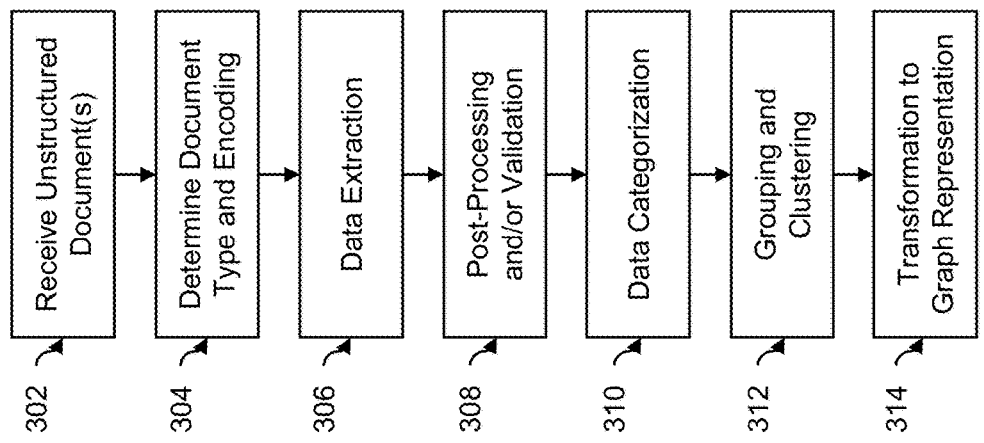
FIG. 3 illustrates a flowchart of an example data ingestion and processing method using the unstructured data loader according to some implementations.

The unstructured data loader 208A is a sophisticated component of the data processing infrastructure designed to ingest, analyze, and structure various forms of unstructured data. In some implementations, the unstructured data loader 208A employs a combination of image processing, optical character recognition (OCR), NLP, ML, and/or LLMs to extract meaningful data from unstructured data sources and transform the data into a structured format suitable for integration into the graph database 204. FIG. 3 illustrates a flowchart of an example data ingestion and processing method using the unstructured data loader according to some implementations.

In an example workflow, the system may receive unstructured document(s) at step 302 from the user via UI 212 or data source(s) 216. Supported formats include, but are not limited to PDF files, plain text documents, Rich Text Format (RTF) files, word documents (.doc, .docx), and/or image files containing text (e.g., .png, .jpg, .tiff), among others. In some implementations, the unstructured data loader 208A performs an initial analysis to determine the document type and encoding at step 304.

For non-image documents, the document may be parsed to extract text content while preserving formatting and layout information. For example, each document page may be converted into a high-resolution image format (e.g., PNG) to capture visual elements and layout. For image-based documents, various image enhancement techniques may be applied to improve clarity and readability. OCR can be performed to extract textual content from the image and the document may be segmented into logical blocks or regions (e.g., paragraphs, headings, tables, figures) using a combination of layout analysis and ML techniques.

In some implementations, the unstructured data loader 208A may extract data from the unstructured documents using one or more LLMs. For each page or logical segment of the document, the image and extracted text may be passed to a pre-trained large language model (LLM) capable of multi-modal analysis. The LLM may be prompted to extract structured information according to a predefined schema such as graph schema 206, including but not limited to, document metadata (e.g., title, author, date, version), key-value pairs, physical quantities and measurements, entities and their relationships, triplets (subject-predicate-object relationships), and/or contextual summaries, among others. In some implementations, the LLM generates a structured output for each page or segment, conforming to a JSON schema similar to that shown in Example 1 below.

Example 1

```
{
    "document_page": "",
    "context": "<Summary of the context and information extracted>",
    "blocks": [
      {
        "block_id": "<sequence number>",
        "entities": [
          {
            "name": "<entity name>",
            "category": "<entity category>"
          },
// Additional entities...
        ],
        "triplets": [
          {
            "subject": "<subject name>",
            "category": "<subject category>",
            "sub_category": "<subject subcategory>",
            "predicate": "<predicate or action>",
            "objects": [
                "<object name>",
// Additional objects...
            ]
          },
// Additional triplets...
        ],
        "key_value_pairs": [
          {
            "key": "<key name>",
            "value": "<value>",
            "unit": "<unit of measurement>"// If applicable
          },
// Additional key-value pairs...
        ],
        "physical_quantities": [
          {
            "quantity": "<quantity name>",
            "value": "<numeric value>",
            "unit": "<unit of measurement>"
          },
// Additional physical quantities...
        ]
      },
// Additional blocks...
    ]
}
```

In some implementations, the extracted information undergoes a series of post-processing steps at step 208. For example, entity resolution and deduplication algorithms may be employed, as well as consistency checking across different blocks and pages, and validation of extracted physical quantities and measurements. In some implementations, a confidence score is assigned to each extracted piece of information based on the LLM's certainty and the results of the validation process.

In some implementations, the extracted and validated data is categorized at step 310 using, for example, a combination of pre-trained classification models, unsupervised clustering algorithms (e.g., k-means, hierarchical clustering), and/or zero-shot classification using LLMs. The categorization process may assign each piece of extracted data to one or more categories based on its content, context, and relationships to other extracted data.

In some implementations, the categorized data is further grouped and clustered at step 312 to identify higher-level concepts and relationships. This process may utilize hierarchical clustering algorithms, word and sentence embedding techniques (e.g., Word2Vec, BERT embeddings), topic modeling algorithms (e.g., Latent Dirichlet Allocation), and/or Semantic similarity measures. The resulting clusters represent related concepts, themes, or topics within the document(s).

The extracted, categorized, and clustered information may be transformed into a graph representation at step 314 based on, for example, graph schema 206, to be stored in a graph database 204. In some implementations, entities of the data become nodes in the graph representation, relationships (including triplets) become edges connecting the nodes, and attributes (including key-value pairs and physical quantities) may be stored as properties of the nodes or edges. The graph representation may be integrated into the semantic graph database 204, wherein new nodes and edges are created for previously unseen entities and relationships, existing nodes and edges are updated with new information, and/or confidence scores and provenance information are stored as metadata. The source document itself may also be stored as a node in the graph representation, with edges connecting it to the extracted data, allowing for easy traceability and context retrieval.

The unstructured data loader 208A is configured to be extensible and adaptable. New document formats can be supported by adding appropriate preprocessing modules. The information extraction schema can be modified or extended to capture domain-specific information. Different LLMs or ML models can be integrated into the unstructured data loader 208A, allowing for continuous improvement as new models become available. The categorization and clustering steps can be fine-tuned or replaced with domain-specific algorithms as needed. This flexibility ensures that the unstructured data loader 208A can be adapted to various use cases and can evolve with advancements in NLP and ML technologies.

As noted above, the structured loader 208B may be configured to ingest data from multiple heterogeneous tabular data sources. A structured loader algorithm may incorporate one or more adapters for each supported structured data source, enabling seamless data extraction and normalization regardless of data origin. In some implementations, the structured loader 208B employs a multi-faceted approach to schema inference and data mapping, offering varying degrees of user involvement and AI assistance.

For example, the structured loader 208B may be configured for user-guided mapping, wherein the system provides a UI 212 that allows users to manually define the mapping between the structured data from one or more data sources 216 and the graph schema 206. In some implementations, the UI facilitates various mapping configurations, including, for example, column-to-node property mapping, column-to-node entity mapping, multi-column to single-node mapping, and/or relationship definition between nodes. Thus, in some implementations the system enables users to define how data from data sources 216 is transformed and loaded into the semantic graph database 204. In column-to-node property mapping, a column from the source data is mapped to a property of a node in the graph database 204. For example, given a spreadsheet with a column labeled "Name," this column can be mapped to the "name" property of a "Person" node in the graph database 204. This mapping is useful for importing attributes of entities, such as names, ages, or addresses, directly into the corresponding properties of nodes. In column-to-node entity mapping, a column from the source data may be mapped to an entire node entity in the graph database. For example, given a column labeled "EmployeeID," the columned can be mapped to create "Employee" nodes in the graph database, with each unique value in the column representing a different "Employee" node. Thus, this mapping can be used for creating nodes based on unique identifiers or key attributes from the source data. In multi-column to single-node mapping, multiple columns from the source data may be mapped to a single node in the graph database, combining the data from these columns into the single node. For example, given columns labeled "FirstName" and "LastName," a single "Person" nodecan be created with properties "firstName" and "lastName." This mapping feature of the system allows for the combination of related data from multiple columns into a single, cohesive node representation in the graph database 204. For defining relationships between nodes, the system is configured to allow defining of relationships between nodes based on the data in the source columns. For example, given a column labeled "ManagerID" and another column labeled "EmployeeID," a relationship can be defined such as "manages" between "Manager" nodes and "Employee" nodes based on the values in these columns. This allows the system to establish connections and relationships between different entities in the graph database, such as hierarchical relationships, associations, or dependencies.

In some implementations, the structured loader 208B also or alternatively comprises an AI-assisted mapping mode that leverages advanced ML techniques to suggest optimal schema mappings. For example, one or more LLMs may be used to analyze source data, column names, and data types to infer potential entity types, relationships, and property mappings. Additionally, the structured loader 208B may utilize pre-existing ontologies or knowledge graphs (e.g., user-provided, third-party developed, or proprietary) to guide the mapping process. In some implementations, AI-generated mapping suggestions are presented to the user via UI 212 for review and modification, allowing for a semi-automated mapping process combining machine intelligence and human domain expertise.

In some implementations, the structured loader 208B also or alternatively comprises fully automated mapping capabilities. For example, in scenarios where minimal user intervention is desired, the structured loader 208B offers a fully automated mapping mode. In some implementations, the system employs the same or similar AI techniques as in the AI-assisted mode but applies them without user intervention. In some implementations, confidence scores may be generated and assigned to each mapping decision, with lower-confidence mappings flagged for potential human review. In some implementations, the AI automated mapping can be fine-tuned over time based on user feedback and corrections, improving its accuracy and adaptability to specific domains.

In addition to explicit relationships defined in the data or mapping, the structured loader 208B can infer implicit relationships between entities. For example, the structured loader 208B may analyze patterns in the data to suggest or establish potential relationships between entities across different tables or files. NLP techniques may be applied to textual fields to extract potential relationships. In some implementations, the structured loader 208B can utilize external knowledge bases and/or ontologies 218 to suggest domain-specific relationships between entities.

In many datasets, especially those integrated from multiple sources, the same entity (e.g., a person, organization, or product) may appear multiple times with slight variations in the data. This leads to data duplication, which can cause inconsistencies and inaccuracies in a database. To address this problem, in some implementations, the structured loader 208B comprises advanced entity resolution capabilities to identify and merge duplicate or related entities across multiple data sources. In some implementations, the structured loader 208B employs deterministic and probabilistic matching techniques to identify potential entity matches. Furthermore, user-configurable matching rules can be defined to customize the entity resolution process for specific domains or data sets. In addition, the system may maintain provenance information for merged entities, allowing for traceability and potential un-merging if needed.

In some implementations, the structured loader 208B facilitates data enrichment through the integration of supplementary data sources of data sources 216. For example, lists of relevant entities can be ingested and used to enhance existing data or create new connections within the graph. Additionally, the structured loader 208B employs various methods for entity matching and enrichment, including but not limited to LLM-based semantic matching, traditional NLP techniques, string similarity measures, and regular expression matching, among others. In some implementations, the system incorporates an advanced summarization capability to generate contextually relevant synopses of enriched data entities and their relationships. For example, the structured loader 208B can leverage various language models, adapting to organizational needs for performance, cost, and data privacy. Also, the structured loader 208B can utilize entity-dense iterative summarization to generates highly informative, entity-rich synopses through initial summarization, entity extraction and prioritization, iterative refinement, incorporating high-priority entities, and optimization for information density and coherence. The structured loader 208B can also utilize context-aware processing to generate summaries that account for broader context within the graph database 204, highlighting connections to related entities and concepts. Summaries generated by the system can include multiple languages, including cross-lingual summarization.

To enhance downstream processing and querying capabilities, the structured loader 208B comprises a robust categorization and tagging system. For example, the structured loader 208B can automatically generate tags for ingested data based on content analysis, metadata, and inferred relationships. Users can further define custom tags and categorization schemes to be applied during the data loading process via the UI 212. In some implementations, the tagging configuration supports hierarchical categories, allowing for multi-level classification of data entities. In some implementations, tags and categories are integrated into the structure of the graph database 204, enabling efficient filtering and traversal in subsequent analysis or reasoning steps.

In some implementations, the structured loader 208B is configured to allow for the integration of custom algorithms and domain-specific logic. The system may provide a well-defined UI 212 for plugging in custom data source adapters, enabling support for proprietary or specialized data formats. Furthermore, users can integrate custom entity resolution algorithms or rules to handle specific matching scenarios. The mapping and inference processes can be extended with domain-specific algorithms or heuristics to capture unique data relationships or structures.

Figure 4:
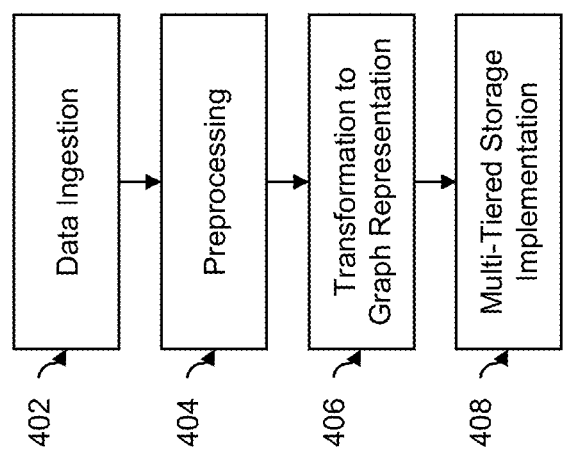
FIG. 4 illustrates a flowchart of an example process for data ingestion and processing of time series data according to some implementations.

In some implementations, data loaders 208 also comprises a time series data loader 208C, integrally designed to ingest, process, and incorporate temporal data sequences into the system. The time series data loader 208C is characterized by its ability to handle diverse time series data sources while maintaining temporal integrity and facilitating seamless integration with other data modalities within the graph database structure. FIG. 4 illustrates a flowchart of an example process for data ingestion and processing of time series data according to some implementations.

The time series data loader 208C is configured to ingest time series data at step 402 from a plurality of data sources such as data sources 216, including but not limited to, CSV files with timestamp columns, JSON formatted time series data, specialized time series databases (e.g., InfluxDB, TimescaleDB), and real-time data streams (e.g., MQTT, Apache Kafka), among others.

Upon ingestion, the time series data loader 208C may perform preprocessing at step 404, such as timestamp parsing and standardization to a common format, detection and handling of missing data points, and outlier detection and optional filtering. Time series data is inherently temporal, meaning that each data point is associated with a specific timestamp. Ensuring that these timestamps are correctly parsed and standardized to a common format is essential for accurate analysis and comparison. Furthermore, missing data points are common in time series data due to various reasons such as sensor malfunctions, data transmission errors, or gaps in data collection. Detecting and handling these missing data points is crucial to maintain the integrity of the dataset and ensure accurate analysis. Outliers are data points that deviate significantly from the expected pattern or trend in the time series. Detecting and optionally filtering outliers is important to prevent them from skewing the analysis and leading to incorrect conclusions. Outliers may be identified using statistical methods (e.g., z-scores, IQR) or ML techniques.

For real-time data streams, the Time Series Loader implements a sliding window approach. For example, a configurable time window may be maintained for each incoming stream and data points within the window may be processed in micro-batches. As new data is received, the time window may slide forward, ensuring continuous processing of the real-time data.

Furthermore, the time series data loader 208C may comprise a configurable resampling module, allowing users to specify a desired time interval for resampling (e.g., hourly, daily, weekly), an aggregation method for downsampling (e.g., mean, median, sum, last value), and an interpolation method for upsampling (e.g., linear, cubic spline, forward fill). The time series data loader 208C may implement a standardization process to ensure consistency across multiple time series, including, for example, time zone normalization, unit conversion (if applicable), and/or scale normalization (e.g., z-score normalization, min-max scaling).

In some implementations, the time series data loader 208C creates a graph representation of time series data within the graph database 204 at step 406. For example, each time series may be represented as a primary node in the graph. Metadata about the time series (e.g., source, units, time range) may be stored as properties of the primary node. Summary statistics, the generation of which are described below, may also be stored as properties of the primary node. For real-time streams, a "current value" property may be maintained and continuously updated.

The time series data loader 208C may implement a multi-tiered storage strategy at step 408 for the time series data. For example, raw time series data points may be stored in a specialized time series database or a designated section of the graph database 204 optimized for temporal data. The graph representation in the graph database 204 may include a reference or link to the location of the full time series data. Recent data points (e.g., last 24 hours) may be stored directly as properties of child nodes connected to the primary time series node, enabling rapid access for real-time analytics.

The time series data loader 208C may establish dynamic relationships within the graph structure. For example, temporal relationships may be created between time series nodes based on overlapping time ranges or correlated patterns (found via dynamic time warping or similar algorithm). Semantic relationships may be established between time series nodes and relevant entities identified in structured or unstructured data, facilitating cross-modal data enrichment. For real-time streams, these relationships may be continuously updated based on incoming data.

As noted above, the time series data loader 208C may compute a comprehensive set of summary statistics for each ingested time series, including but not limited to, basic statistical measures: mean, median, standard deviation, minimum, maximum, temporal characteristics: start time, end time, duration, sampling frequency, trend indicators: linear regression coefficients, seasonal decomposition parameters, variability measures: coefficient of variation, interquartile range, autocorrelation and partial autocorrelation at various lags, spectral analysis results: dominant frequencies, spectral entropy, and/or complexity measures: sample entropy, Lyapunov exponent, among others. These summary statistics are attached to the graph representation of the time series in the graph database 204, enabling efficient querying and analysis without necessitating access to the full time series data for every operation.

The time series data loader 208C may also implement pattern recognition to identify recurring patterns or anomalies within and across the time series. For example, the time series loader 208C may utilize dynamic time warping for flexible pattern matching, matrix profile algorithms for efficient all-pairs-similarity search, and/or anomaly detection based on statistical, distance-based, or ML approaches. Recognized patterns and anomalies may be indexed and linked to the graph representation in the graph database 204, facilitating rapid retrieval and cross-referencing. In some implementations, for real-time data streams, the pattern recognition module operates on the sliding window, such that incremental pattern matching algorithms are employed to update pattern indices as new data arrives, and real-time anomaly detection is performed, with anomalies immediately represented as nodes in the graph, linked to the relevant time series and temporal context.

The time series data loader 208C further comprises a real-time processing engine to handle continuous data streams. The engine may comprise implementation of a stream processing framework (e.g., Apache Flink, Spark Streaming) for scalable, low-latency data processing, and perform continuous computation of summary statistics, updating the properties of the corresponding graph nodes in real-time. Dynamic adjustment of sliding window sizes based on data velocity and pattern complexity may be performed by the engine. The real-time processing engine enables immediate insights and alerts. For example, continuous evaluation of predefined conditions or thresholds may trigger alerts or actions when met. Furthermore, real-time updating of dashboards and visualizations of the UI 212 connected to the graph database 204 may be performed. Immediate propagation of detected anomalies or significant pattern changes to relevant parts of the graph representation enable rapid response to evolving situations.

Natural Language Reasoning

Figure 5:
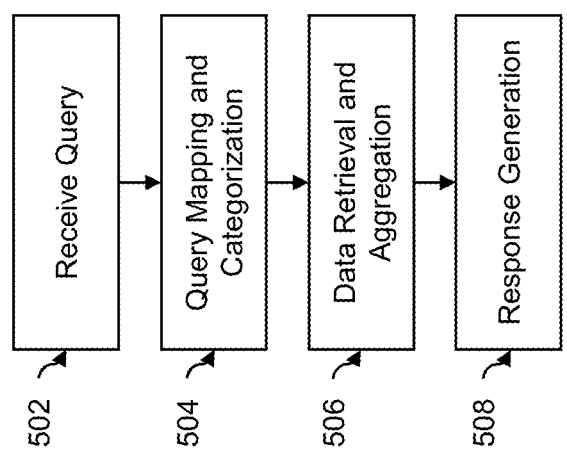
FIG. 5 illustrates a flowchart of an example query processing workflow according to some implementations.

In some implementations, the Natural Language Reasoning Engine 210 interprets and processes complex natural language queries received via UI 212, leveraging advanced algorithms and ML techniques to navigate and extract information from the graph database 204. The architecture of the Reasoner 210 is specifically designed to handle intricate reasoning chains and temporal understanding, utilizing a multi-faceted approach for query processing and execution. In some implementations, the Reasoner 210 comprises one or more LLMs to facilitate natural language understanding and generation. The integration of LLMs is implemented through a flexible architecture that supports third-party hosted models of external LLM providers, allowing for the utilization of continually updated and improved models without the need for local infrastructure. In some implementations, the Reasoner 210 comprises in-house hosted models, such as for or organizations with specific security requirements or customization needs. In some implementations, the Reasoner 210 is also configured to leverage pre-fine-tuned models that have been optimized for specific domains or tasks. The Reasoner 210 may perform fine-tuning itself or can seamlessly integrate and utilize models that have undergone task-specific or domain-specific fine-tuning processes. The model integration framework of the Reasoner 210 is configured for incorporation of various LLM architectures and versions. This flexibility ensures that the system can benefit from advancements in language model technology without requiring significant architectural changes. FIG. 5 illustrates a flowchart of an example query processing workflow according to some implementations.

In some implementations, the primary function of the Reasoner 210 is query processing and execution of queries received via UI 212 at step 502. In some implementations, the Reasoner 210 employs a hierarchical, multi-algorithm approach to interpret user queries and retrieve relevant information from the graph database 204. In some implementations, the Reasoner 210 maps the user's query intent to the most relevant categories at step 504 generated by the unstructured and structured data loaders 208A and 208B, respectively. This mapping may be achieved through multiple complementary methods.

For example, LLM-based category prediction may be utilized to predict the top N categories based on a predefined list of categories within the system. This approach leverages the semantic understanding capabilities of the LLM to associate the query with the most pertinent categories. The output of this step may comprise a structured list of category predictions, formatted as shown in Example 2 below, wherein <score-n> represents the probability score assigned by the LLM to each category.

Example 2

```
[
  {
    "category": "Category-name-1",
    "score": <score-1>
  },
  {
    "category": "Category-name-2",
    "score": <score-2>
  },
  ...
]
```

In some implementations, the Reasoner 210 may also utilize entity-based graph expansion, including entity extraction techniques to identify key entities within the user query. These entities may be mapped to corresponding nodes in the graph database 204. Subsequently, graph expansion algorithms, such as breadth-first search, depth-limited search, or PageRank-based importance propagation, may be applied to explore the neighborhood of these entities and identify relevant subgraphs of graph database 204.

In some embodiments, the Reasoner 210 may utilize embedding-based Similarity Matching, wherein the Reasoner 210 generates embeddings for the user query using advanced embedding algorithms such as BERT, GPT, or domain-specific embedding models. These query embeddings may be compared to pre-computed embeddings associated with ingested data (both structured and unstructured) using similarity measures such as cosine similarity or Euclidean distance.

In some implementations, the query is matched by the Reasoner 210 against high-level summaries generated across the graph based on embedding similarity. These summaries, created during the data ingestion process, serve as concise representations of larger data subsets, enabling efficient preliminary matching.

In some implementation, the Reasoner 210 may retrieve relevant data from the graph database 204 at step 506. This process may comprise subgraph extraction, wherein, based on the identified categories and entities during mapping and categorization, relevant subgraphs are extracted from the graph database 204. In some implementations, retrieved data elements are scored for relevance using a combination of factors, including category match strength, embedding similarity, and graph structural importance metrics. In some implementations, the most relevant data elements are aggregated and prepared by the Reasoner 210 for input into a response generation step 508.

The response generation process leverages the power of LLMs while ensuring grounding in the retrieved data. In some implementations, the relevant data retrieved from the graph database 204 is formatted into a context document, providing the LLM with the necessary information to generate an accurate response. The prepared context and the original user query may be input into the LLM, which generates a natural language response based on the provided information. In some implementations, each statement in the generated response is associated with references to specific nodes or edges in the graph database, ensuring traceability and verifiability of the information. Furthermore, the Reasoner 210 may assign confidence scores to different parts of the generated response based on factors such as data source reliability, consistency with multiple sources, and LLM confidence metrics.

The Reasoner 210 is designed to integrate seamlessly with both API-based and user interface-based interactions. In API responses, statements generated by the Reasoner 210 may be structurally linked to references in the knowledge graph, providing a machine-readable format for result verification and further processing. In the UI 212, users may view the underlying references for each statement in the output of the Reasoner 210. This feature allows users to inspect the source data, enhancing transparency and trust in the system's outputs.

The Reasoner 210 may also incorporate robust security measures to ensure data confidentiality and appropriate access control. For example, information within the graph database 204 can be encrypted, protecting it from unauthorized access. Furthermore, the system may implement a sophisticated access control mechanism that limits the data used for reasoning based on the user's access rights. This ensures that users only receive information they are authorized to access. During the reasoning process, the system may dynamically filter the available data based on the user's access privileges, ensuring that generated responses adhere to established security policies.

Integration of Algorithmic Components

The system advantageously integrates the various components described herein such that the system performs more effectively than each part on its own. This integration improves the system in several important ways:

For example, the structured, unstructured, and time series data loaders work in concert to create a rich, multidimensional graph representation within the graph database 204. This integration allows for entity resolution across diverse data modalities, contextual enrichment of structured data with unstructured information, and temporal anchoring of entities and relationships extracted from unstructured data, facilitating time-aware analysis and reasoning. These integrations are demonstrated in the following examples 3 and 4 of Oil and Gas Operations and Private Investigation of a Potential International Criminal example use cases, respectively.

Example 3

The structured data loader 208B ingests well data, geological surveys, and regulatory compliance databases, creating nodes for disposal wells, geological formations, and operational parameters. The unstructured data loader 208A processes field engineer comment, legal documents including commitments and disposal volumes. The time series data loader 208C analyzes historical injection rates, seismic activity data, and groundwater quality measurements over time.

Entity resolution across data modalities enables the system to link a disposal well mentioned in a field engineer's comments Ito the corresponding node in the structured operational data. Contextual enrichment of structured well data with unstructured information provides deeper insights, such as associating changes in injection rates with contractual obligations in processed documents. Temporal anchoring of entities and relationships allows the system to correlate seismic events extracted from time series data with specific injection activities and geological characteristics.

The system's ability to dynamically adjust its internal knowledge representation is a direct result of the integrated operation of its core algorithms. The categorization and clustering mechanisms of the unstructured data loader 208A inform the schema evolution of the structured data loader 208B, and vice versa. Temporal patterns identified by the time series loader 208C influence the relationship inference processes of both structured and unstructured data loaders 208B and 208A, respectively, capturing time-dependent associations. The graph schema 206 of the graph database core 202 allows for continuous refinement based on insights generated by all data loaders 208, creating an ever-evolving knowledge representation.

Example 4

The unstructured data loader 208A processes news articles, social media posts, and witness statements related to the subject of investigation. The structured data loader 208B ingests databases of known associates, financial transactions, and travel records. The time series loader 208C analyzes patterns in communication metadata, financial flows, and location data over time.

The categorization and clustering mechanisms of the unstructured data loader 208A inform the schema evolution of the structured data loader. Temporal patterns identified by the time series loader 208C, such as periodic financial transactions or travel behaviors, influence the relationship inference processes of both structured and unstructured data loaders 208B and 208A, respectively, capturing time-dependent associations between the subject and potential criminal activities. The graph schema 206 of the graph database core 202 allows for continuous refinement based on insights from all data loaders 208, creating an ever-evolving knowledge representation that can quickly incorporate new evidence or intelligence.

Furthermore, the integration of time series analysis with semantic information extraction enables sophisticated reasoning across multiple temporal and conceptual scales. Temporal patterns identified in time series data can be semantically interpreted using concepts extracted from unstructured data, allowing for high-level understanding of complex temporal phenomena. The multi-scale representation of time series data may align with hierarchical categorizations derived from unstructured data, facilitating reasoning that seamlessly transitions between different levels of temporal and conceptual granularity. The natural language reasoning engine 210 can leverage both semantic relationships and temporal dynamics to generate more accurate and contextually relevant responses.

This integration is demonstrated by the following Example 5 of a Climate Change Impact Assessment.

Example 5

The time series loader 208C ingests long-term climate data, including temperature, precipitation, and sea level measurements. The unstructured loader 208A processes scientific reports, policy documents, and news articles related to climate change. The structured loader 208B incorporates data on greenhouse gas emissions, energy consumption, and economic indicators.

Temporal patterns in climate data are semantically interpreted using concepts extracted from unstructured data, allowing for high-level understanding of complex phenomena such as the relationship between El Niño events and global temperature anomalies. The multi-scale representation of time series data aligns with hierarchical categorizations derived from unstructured data, facilitating reasoning that seamlessly transitions between different levels of temporal (e.g., daily weather patterns to decadal climate trends) and conceptual (e.g., local ecosystem impacts to global policy implications) granularity. The natural language reasoning engine 210 leverages both semantic relationships and temporal dynamics to generate accurate and contextually relevant responses to queries such as "How have climate policies implemented in the last decade affected global temperature trends?"

The hallucination detection and mitigation mechanisms also benefit from the integrated nature of the system. For example, cross-validation of information across different data modalities enhances the system's ability to identify and correct potential hallucinations. Furthermore, temporal consistency checking, enabled by the integration of time series data, provides an additional dimension for verifying the plausibility of generated responses. Provenance tracking capabilities, spanning all data loaders 208 allow for fine-grained attribution and confidence assessment of each component of a generated response.

Additionally, the query processing capabilities of the natural language reasoning engine 210 are significantly enhanced by the integrated algorithmic framework. For instance, query interpretation leverages the categorization schemes developed by the unstructured data loader 208A to map natural language concepts to appropriate regions of the graph database 204. Query execution plans are optimized based on the multi-modal nature of the underlying data, seamlessly combining graph traversal, time series analysis, and semantic reasoning as required. Furthermore, the system can dynamically adjust its reasoning strategies based on the confidence scores and data quality metrics generated by each component data loader 208.

Technical Advantages, Definitions, and Integrations

In addition to the advantages noted above, the system advantageously overcomes various of the technical challenges of data analysis and practical actionable data visualization and reasoning. Problem solving using data often involves integrating and correlating vast amounts of disparate data sources. In some implementations, the system comprises advanced data integration modules that provide the system with the capability to seamlessly gather and organize data from multiple sources. As such, the system may offer a unified and comprehensive view of the data landscape. Additionally, the system employs sophisticated algorithms to continuously learn and adapt, ensuring that the insights and recommendations it provides are always relevant and current.

Furthermore, a key aspect of data analysis and practical actionable data visualization and reasoning is the ability to derive meaningful insights from complex data sets. However, extracting these insights is a time and resource-intensive process with existing tools. The system's automated reasoning engine allows for efficient and automated analysis of data to identify optimal solutions.

The system also advantageously addresses the existing and unsolved challenges of implementing AI/ML in data-driven decision-making processes. All models rely heavily on high-quality data for training and validation. In the field of data analysis and practical actionable data visualization and reasoning, obtaining and managing the necessary data is extremely difficult. The system includes robust data preprocessing and cleaning mechanisms to ensure the quality and consistency of the data used. Moreover, the format and types of data and designs vary depending on the source. The system addresses these challenges by standardizing and normalizing data from diverse sources, making it suitable for analysis and model training.

In addition to lacking a sufficient amount and quality of data, existing AI/ML solutions are also often siloed and lack interoperability. Consequently, these solutions lack compatibility and interoperability with other systems and data sources. In contrast, the system comprises a modular and extensible architecture that can be used to integrate with various external systems and data sources seamlessly.

The present disclosure further includes various processes, functionality, and interactive user interfaces related to the system. According to various implementations, the system (and related processes, functionality, and interactive dynamic user interfaces), can advantageously manage and analyze complex interactions between various components and subsystems. Advantageously, the system leverages advanced AI/ML techniques to provide real-time insights and recommendations, adapting to new data and evolving conditions dynamically.

Various implementations of the system provide improvements to various technologies and technological fields, enhancing capabilities across multiple domains. For example, the system may advantageously provide more precise predictive analytics and decision-making support. The computational power provided by the system allows for the design of more sophisticated and efficient systems, pushing the boundaries of technological possibility in fields such as healthcare, finance, and logistics. Other technical benefits provided by various implementations of the system include, for example, enhanced data security and privacy through advanced encryption and anonymization techniques. Furthermore, in some implementations, the system facilitates seamless interdisciplinary computation by integrating insights and knowledge from various fields in a unified framework.

In some implementations, by automating the process of data collection, preprocessing, and analysis, the system significantly reduces the manual effort required to manage and interpret large datasets. The system is configured to analyze vast datasets and perform complex simulations with unprecedented speed and accuracy, enabling faster and more informed decision-making processes.

Additionally, implementations of the system are inextricably tied to computer technology. Various implementations rely on advanced computational capabilities to process vast amounts of data, perform complex calculations, and execute sophisticated algorithms. These capabilities are provided by modern computer technology, which includes powerful processors, high-performance computing (HPC) systems, and cloud computing platforms. For example, the real-time analysis and visualization of large-scale data cannot be completed by humans alone. Further, the implementation of the system via computer technology enables many of the advantages described herein, including more efficient interaction with, and presentation of, diverse types of electronic data.

Thus, various implementations of the present disclosure can provide improvements to various technologies and technological fields, and practical applications of various technological features and advancements. Additionally, various implementations of the present disclosure are inextricably tied to computer technology. Various implementations rely on operation of technical computer systems and electronic data stores, automatic processing of electronic data, and the like. Such features and others (e.g., processing and analysis of electronic data, and/or the like) are intimately tied to, and enabled by, computer technology, and would not exist except for computer technology. For example, the interactions with, and management of, computer-based models described herein in reference to various implementations cannot be performed by humans alone, without the computer technology upon which they are implemented. Further, the implementation of the various implementations of the present disclosure via computer technology enables many of the advantages described herein, including more efficient and dynamic management and presentation of various types of electronic data without user input (including computer-based models).

As used herein, the term "model" can include any computer-based AI and/or ML models of any type and of any level of complexity, such as any type of sequential, functional, or concurrent model. Models can further include various types of computational models, such as, for example, artificial neural networks ("NN"), language models (e.g., "LLMs"), AI models, ML models, multimodal models (e.g., models or combinations of models that can accept inputs of multiple modalities, such as images and text), and/or the like.

In various implementations, the system, the separate components/modules of the system, and/or the one or more models of the system may be locally hosted, cloud managed, accessed via one or more APIs, and/or any combination of the foregoing and/or the like. Additionally, in various implementations, the system, the separate components/modules of the system, and/or the one or more models of the present disclosure may be implemented in or by electronic hardware such as computer processors. In some implementations, various separate components of the system may be decoupled from other components of the system, such that some components are locally hosted, while others are cloud managed and/or accessed via one or more APIs.

Examples of pre-trained LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), BigScience Large Open-science Open-access Multilingual Language Model (BLOOM), and Mistral and future versions of other such open and commercial foundation models.

In some implementations, the system may be integrated within a to a Software as a Service (Saas) platform designed to provide the functionalities described herein to users over the Internet. The SaaS platform may be implemented as a cloud-based solution, enabling users to access the system through a web browser or other internet-enabled devices and/or applications without the need for local installation or maintenance. In some implementations, the system may be provided to a user through a local installation of the system on a user device.

Additional Examples and Implementations

In some implementations, the system loads data in the form of "stories" that are quantized in time and location in small information packets called "evidence." A story comprises a plurality of packets of evidence. In some implementations, the system uses a micro-service agent/component/module architecture, such as that described in connection with FIG. 2 to perform data loading, connecting, enriching, visualizing, and reasoning. These agents/components/modules generally perform specific discrete tasks, depending on the domain/use case, such as, for example, given a packet of evidence, extract specific data from the evidence and convert the data into a standardized unit. The same or a different agent/component/module may draw a conclusion or perform reasoning on the converted data in response to a user of API query. In some implementations, the same or a different agent/component/module, given a plurality of packets of evidence forming a story, may load the packets of evidence in the graph database. In some implementations, this process may involve accessing or generating a set of entities and an entity type from the data within the packets of evidence, identifying the entities in all of the relevant packets of evidence, and storing each instance of each entity in the graph database. Furthermore, a link may be created between each instance of the entity and the packet of evidence from which the instance was identified. In some implementations, the same or a different agent/component/module may identify a pattern and a pattern type within the packets of evidence, store the pattern and pattern type in the graph database, and create a link between the instance of the pattern and the packet of evidence in which the pattern was identified. In some implementations, the same or a different agent/component/module, given a question (or query) and a packet of evidence, may process and answer the question about the packet of evidence, store the answer in the graph database, and create a link between the answer and the packet of evidence. If any other parts of the graph database were used in the reasoning to generate the answer, the same or a different agent/component/module may store this "chain of evidence" with the answer such that the answer or conclusion has a stored basis.

In some implementations, agents/components/modules can be chained together to build more powerful agents/components/modules using data frameworks, such as llamaindex, langchain and/or a host of genIT tools.

Figure 6:
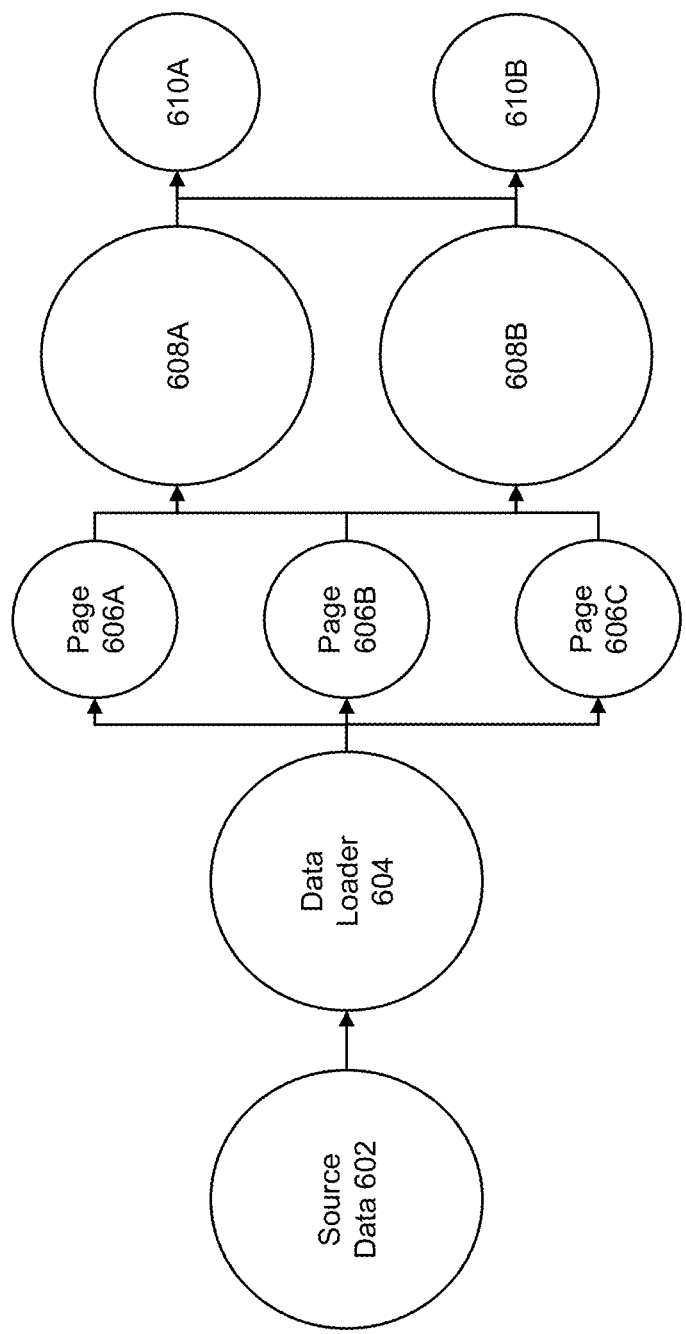
FIG. 6 illustrates an example computational audit trail according to some implementations.

The system architecture may enable a computational audit trail within the graph database. This audit trail enables user to identify not only typical entities/relationships, but a trail of how those entities/relationships were created from the computational agents/components/modules using the source data. FIG. 6 illustrates an example computational audit trail according to some implementations. Source data 602 may be processed by a computational agent/component/module, such as a data loader 604, which may convert the source data and extract out individual pages 606A, 606B, and 606C. These individual pages may be further analyzed for entities by a second layer of computational agents/components/modules 608A, 608B, which may comprise data loader 604 and/or other agents/components/modules of the system. The computational agents/components/modules 608A, 608B may extract further information 610A, 610B from pages 606A, 606B, 606C. This audit trail allows for traceability from extracted content to the agents/components/modules that generated the extracted content.

Large multi-modal models (LMMs) and LLMs have limited context windows, which limits the amount of data that those models can reason over. Knowledge graphs have strong semantic labeling which is useful for LLM/LMM's, but knowledge graphs are also expansive data structures which limits their practical applicability. To address this issue, in some implementations, the system extracts knowledge graphs from source data in a compressed format using graph query language that preserves the nodes and relationships between nodes, but without repetitive labels, properties, and structures that otherwise bloat the context space. Example 6 illustrates graph query language that can be used to extract a compressed structure by exporting the default graph structure generated by the query.

Example 6

$$\text{MATCH } p = (n) - [\,] - (\,)$$
$$\text{WHERE } ID(n) = 1433 \text{ RETURN } p$$

In some implementations, this compressed structure is stored, for example as JSON, which enables the compressed structure to be passed between the computational agents/components/modules as needed. For example, in some implementations, this compressed structure can be provided to labelers of the data loaders or natural language reasoning engine, which can utilize the compressed structure to generate training examples, which can be used as golden truth examples for training or fine tuning an LLM/LMM of the data loaders 208 or natural language reasoning engine. This process allows the model to be more accurate and efficient when performing inference.

Figure 7:
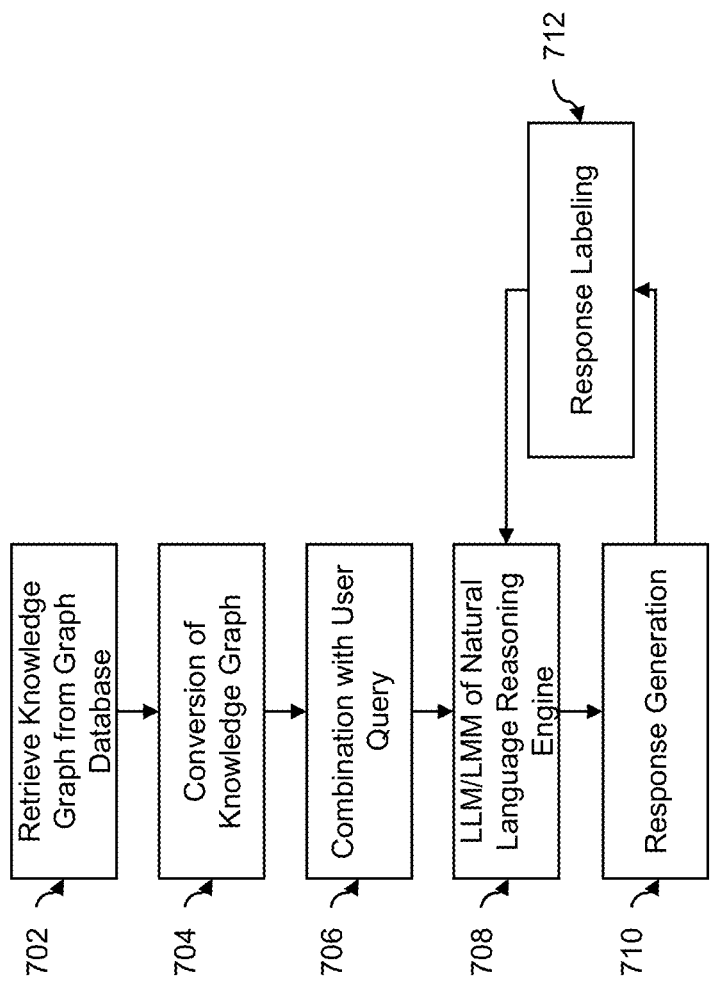
FIG. 7 illustrates a flowchart of an example training/inference workflow in response to a user query according to some implementations.

FIG. 7 illustrates a flowchart of an example training/inference workflow in response to a user query according to some implementations. In some implementations, in order for the model(s) of the natural language reasoning engine to perform inference, a knowledge graph retrieved from the graph database at step 702 may go through a similar or the same extraction and compression process where it is converted into, for example, a JSON structure at step 704. The JSON structure may be combined with a user query at step 706. The combined JSON/User Query may be passed to the LLM/LMM at step 708, which generates inference over the compressed structure/user query and generates a reasoned output at step 710. That reasoned output or response can optionally be automatically fed back as training data to the LLM/LMM, or it can be optionally manually or automatically labeled at step 712 before being fed back as training data to the LLM/LMM.

In some implementations, the graph database is configured to allow the Reasoner to cite sources, such that a transparent audit trail can be generated for LLM responses, citing specific parts of the evidence-based story telling knowledge graph from which reasoning originated. For example, the system may reference the graph database using the evidence node ID in all the reasoning explanations/responses that the system generates, providing trust and transparency in all explanations/responses and reducing hallucination of the models.

In some implementations, the LLM/LMM of the Reasoner may be prompted to restrict its responses to only use data contained in the graph database. As such, the system can reduce the tendency to have the large language model hallucinate. In some implementations, this custom prompting binds the LLM reasoning to consider only data elements that are contained in the knowledge graphs of the graph database. As such, when the Reasoner processes a query, the Reasoner always knows the source data or evidence to support its response to the query. Thus, when the system produces an "answer", the "reason" is the "chain of evidence" that it referenced in constructing the answer. The disclosed system provides an audit trail to from nodes/relationships agents/components/modules that produced the nodes/relationships, to the source data itself (table and key level tracking), allowing for visibility from result to code to source data.

In some implementations, the main types of nodes in the evidence-based story telling knowledge graph of the graph database are evidence nodes. There can be different types if evidence, for example in oil and gas there will be drilling reports, production information, and wellbore information. In some implementations, each node comprises an ID and a plurality of data fields that allow the system to trace the source of the evidence. The system may also use XQ message functionality to control access and traceability of which users access the evidence to allow for audit trail and explainability. Example 7 describes a data ingestion and formatting according to an evidence-based story telling knowledge graph framework utilized according to some implementations.

Example 7

In some implementations, the system loads and enriches packets of evidence into the evidence-based story telling knowledge graph by loading the evidence files from a data source. In some implementations, all evidence nodes in the graph may comprise an evidence label and a label that can be the same as the filename of the file from which the evidence was derived, ensuring traceability back to the sources. In some implementations, all the files under the evidence folder can have the same label name as the file name and can also be stored under the label "evidence."

After the evidence loader runs, new evidence and entity folders can be created storing the processed evidence files with all the evidence properties. In some implementations, an entity folder contains files with the name that are present in the evidence csv file. The evidence files are loaded to the graph database with the property names in the csv file. The entity files are loaded forming relationships with the evidence node and labelled.

Various agents/components/modules may be utilized to perform enrichment-type actions, such as entity extraction, classification, and/or pattern extraction. In some implementations, the enrichments are based on queries that are contained in a queries JSON file that is passed along with the evidence to agents/components/modules to perform the extractions and document how the extractions were performed, what queries are the answers/responses generated from, for full traceability into how the enrichments were completed.

In some implementations, agents/components/modules may be utilized to generate entities and form relationships with the evidence. For example, agents/components/modules may create entity nodes based on a given csv file, entity nodes for all the csv files in the directory, entity nodes based on regex pattern provided in a csv file, or entity nodes by querying the AI/ML models. In some implementations, the system may also store the specific LLM model name the extraction abilities from multiple LLMs may be compared. Multiple models can effectively use this technique to learn from each other by having a model that reasons over the results of a sub-model.

Utilization of the knowledge graph enables generative learning combining both Human and AI/ML insights. In some implementations, the system pioneers generative learning by employing a human and AI question/answering system. In some implementations, the Reasoner uses a knowledge graph and a set of queries as input, queries the evidence, generates answers, and stores the answers in the evidence-based storytelling knowledge graph. Human queries and answers may be stored in one knowledge graph, and the AI queries and answers may be stored in another knowledge graph. As such, the system may distinguish between answers based on human and AI-generated queries. This allows for an additional level of traceability and transparency in the system. The system may also train the AI/ML based on users queries such that it can improve the types of queries generated by the system. In some implementations, the Reasoner uses artificial intelligence, retrieval augmented generation (RAG), and prompt engineering to answer both human and AI-generated queries about the body of evidence and stores these answers back in a secondary knowledge graph.

In some implementations, the system reasons over the evidence-based story telling knowledge graph and uses the evidence in the knowledge graph to create answers. These answers may also be stored in a separate knowledge graph from the original knowledge graph such that they can be reviewed by another AI or human agent for possible inclusion in a future version of the evidence knowledge graph. These "answers" can contain multiple references to nodes in the evidence-based story telling knowledge graph, this list of references to evidence may be referred to as a "Chain of Evidence".

"Stories" may comprise plots or hypothesis about the knowledge graph. Stories may comprise multiple queries. In some implementations, the system answers these questions and stores the associated reasons and the answers in the graph along with the chains of evidence that support the answers. This technique provides both transparency and reasoning explainability. The knowledge graph that is created from the human-based questions may be stored. These questions can be reviewed for inclusion in a future iteration of the evidence-based storytelling knowledge graph.

In some implementations, the system may also be configured such that the AI/ML generates queries about the body of evidence from multiple perspectives, such as "What questions would you ask about the graph from a certain perspective?" The answers to these queries may be stored in the third knowledge graph.

In some implementations, the system enables reasoning over all three graphs together or separately ensuring control over what evidence and answers are included in future reasoning. This is a form of artificial learning because the system can load evidence and have the Reasoner reflect on this evidence and generate questions about the evidence and store these answers back in a knowledge graph that contains the answers. This form of artificial learning and reasoning is generative and recursive.

In this manner, artificial knowledge can be provided through a set of paths through a knowledge graph that answers a question from a certain perspective. By analyzing the interconnected evidence and entities, the system may provide meaningful insights answers to questions/queries. Additionally, the system may enable different perspectives on the datasets by asset, giving a comprehensive view from different angles. As new evidence is introduced to the graph, the system may enhance the reasoning capabilities and enable informed decision making based on likely paths through the evidence.

In some implementations, the system may utilize asynchronous instances that are used across different users. For example, data updated on one instance, whether manually or automatically, is synced to a master knowledge graph. This master graph contains comprehensive data, allowing for new insights with a holistic view. Users can then narrow down the data to a user-specific level, ensuring personalized and relevant information.

In some implementation, the system may utilize a workflow comprising initially loading data into a local graph, building a personalized knowledge base. This local graph serves as the initial repository of user-specific data. The local graph connects to a server, where the system loads the graph and identifies entities already present in the master knowledge graph. The system generates a comprehensive view by integrating the local graph with the master graph.

Example 8

In some implementations, the system may be configured to securely synchronize and reason across distributed graph representations, including evidence graphs, comprising, for example, enterprise evidence graphs and/or user evidence graphs. For example, users may gather data by interacting with external entities, uploading the collected evidence to the user graph, which securely transfers the data to the enterprise graph. The enterprise graph processes and enriches this data, identifying related nodes and filtering by security clearance before synchronizing enriched evidence back to the user's graph, enabling secure, distributed reasoning within permitted classification levels.

In some implementations, the system establishes a secure data collection, synchronization, and reasoning system involving two core graph structures, including an enterprise evidence graph comprising a centralized, secured knowledge graph where all collected evidence across an organization is stored, analyzed, and reasoned over and a user evidence graph comprising local knowledge graph associated with individual users who interact with target entities and gather relevant data.

In some implementations, users interact with various target entities (referred to as "targets") in the field to collect diverse datasets. These datasets, which may include structured, unstructured, or high-frequency data, are loaded directly into the user's local knowledge graph upon collection, forming an initial evidence base in the user evidence graph.

In some implementations, once the evidence is collected, the evidence may be securely transferred to the enterprise graph as an encrypted "cypherFile." This file, upon reaching the enterprise graph server, is automatically decrypted and processed into the enterprise graph. The process is managed by a message queue architecture to ensure asynchronous and reliable data loading.

Upon integrating new data, the enterprise graph may perform an enrichment process to identify existing nodes that share edges with the newly uploaded entities. This process includes, for example, detecting nodes that are at least "n" edges away from the uploaded evidence nodes and finding pathways between the new evidence nodes and any related entities in the graph.

In some implementations, by employing pathfinding and graph expansion algorithms, the enterprise graph locates interconnected nodes relevant to the new evidence, creating an enriched subset of the graph that holds potential associations and insights.

In some implementations, the expanded graph subset undergoes security filtering based on each user's classification level. Only nodes and edges matching the user's clearance level or lower are retained, ensuring that no unauthorized information is transmitted back to the user. In some implementations, the filtered subset of the enterprise graph is then securely transferred back to the user's evidence graph. The user locally merges this subset with their existing graph, which enhances their knowledge without compromising security protocols.

In some implementations, the user can now perform graph-based reasoning (using techniques such as graph-based retrieval-augmented generation, or graphRag) over this enriched data. The local reasoning process is limited to evidence permitted by the user's security level, ensuring that sensitive data remains accessible only in the enterprise graph.

In some implementations, the enterprise evidence graph remains the sole environment where unrestricted reasoning across all security levels can be conducted, safeguarding higher-classification information while allowing field users to leverage enriched evidence within their security scope.

Computer System

Figure 8:
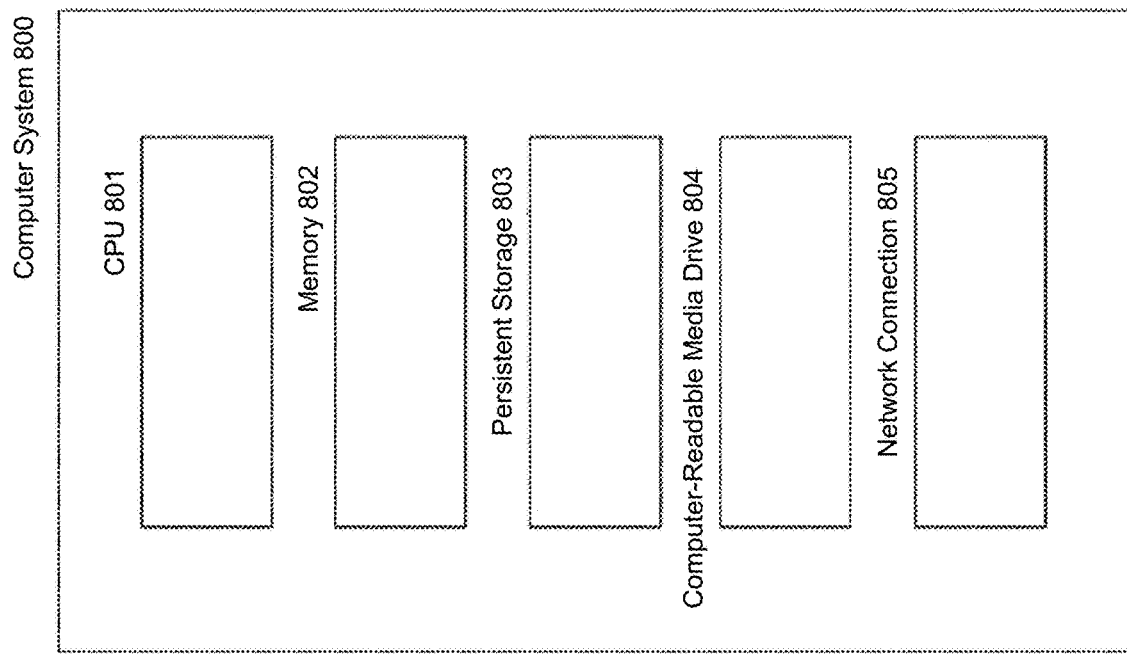
FIG. 8 is a block diagram showing some of the components typically incorporated in at least some of the computer systems and other devices on which the disclosed system operates in accordance with some embodiments of the present technology.

FIG. 8 is a block diagram showing some of the components typically incorporated in at least some of the computer systems and other devices on which the disclosed system operates. In various embodiments, these computer systems, and other devices 800 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit (CPU) 801 for executing computer programs; a computer memory 802 for storing programs and data while they are being used, including the facility and associated data, an operating system including a kernel, and device drivers; a persistent storage device 803, such as a hard drive or flash drive for persistently storing programs and data; computer-readable media drives 804 that are tangible storage means that do not include a transitory, propagating signal, such as a floppy, CD-ROM, or DVD drive, for reading programs and data stored on a computer-readable medium; and a network connection 805 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations and having various components.

Figure 9:
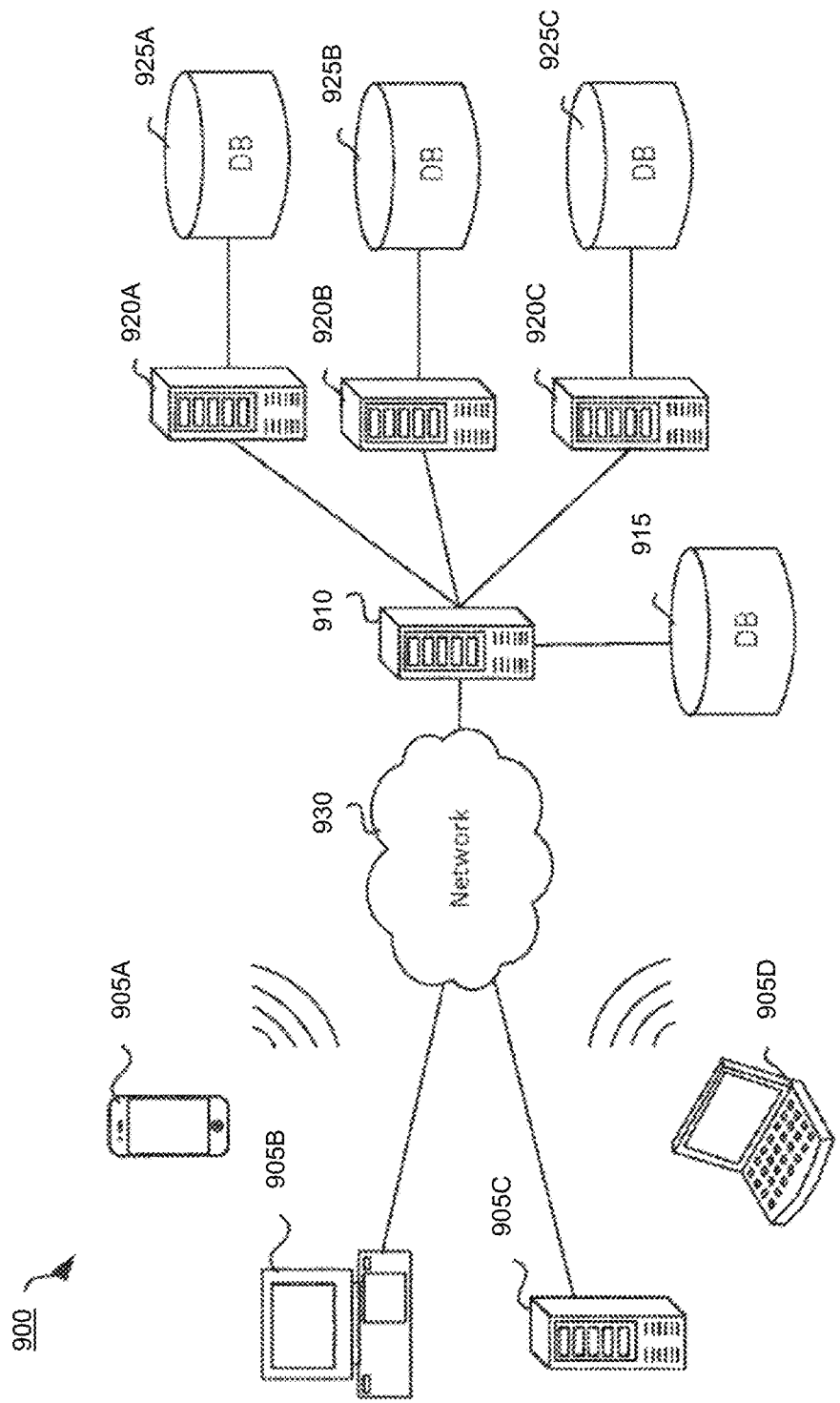
FIG. 9 is a system diagram illustrating an example of a computing environment in which the disclosed system operates in some embodiments of the present technology.

FIG. 9 is a system diagram illustrating an example of a computing environment in which the disclosed system operates in some embodiments. In some embodiments, environment 900 includes one or more client computing devices 905A-D, examples of which can host the system 100. Client computing devices 905 operate in a networked environment using logical connections through network 930 to one or more remote computers, such as a server computing device.

In some embodiments, server 910 is an edge server which receives client requests and coordinates fulfillment of those requests through other servers, such as servers 920A-C. In some embodiments, server computing devices 910 and 920 comprise computing systems, such as the system 100. Though each server computing device 910 and 920 is displayed logically as a single server, server computing devices can each be a distributed computing environment encompassing multiple computing devices located at the same or at geographically disparate physical locations. In some embodiments, each server 920 corresponds to a group of servers.

Client computing devices 905 and server computing devices 910 and 920 can each act as a server or client to other server or client devices. In some embodiments, servers (910, 920A-C) connect to a corresponding database (915, 925A-C). As discussed above, each server 920 can correspond to a group of servers, and each of these servers can share a database or can have its own database. Databases 915 and 925 warehouse (e.g., store) information such as home information, recent sales, home attributes, and so on. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN) but can also be other wired or wireless networks. In some embodiments, network 930 is the Internet or some other public or private network. Client computing devices 905 are connected to network 930 through a network interface, such as by wired or wireless communication. While the connections between server 910 and servers 920 are shown as separate connections, these connections can be any kind of local, wide area, wired, or wireless network, including network 930 or a separate public or private network.

Figure 10:
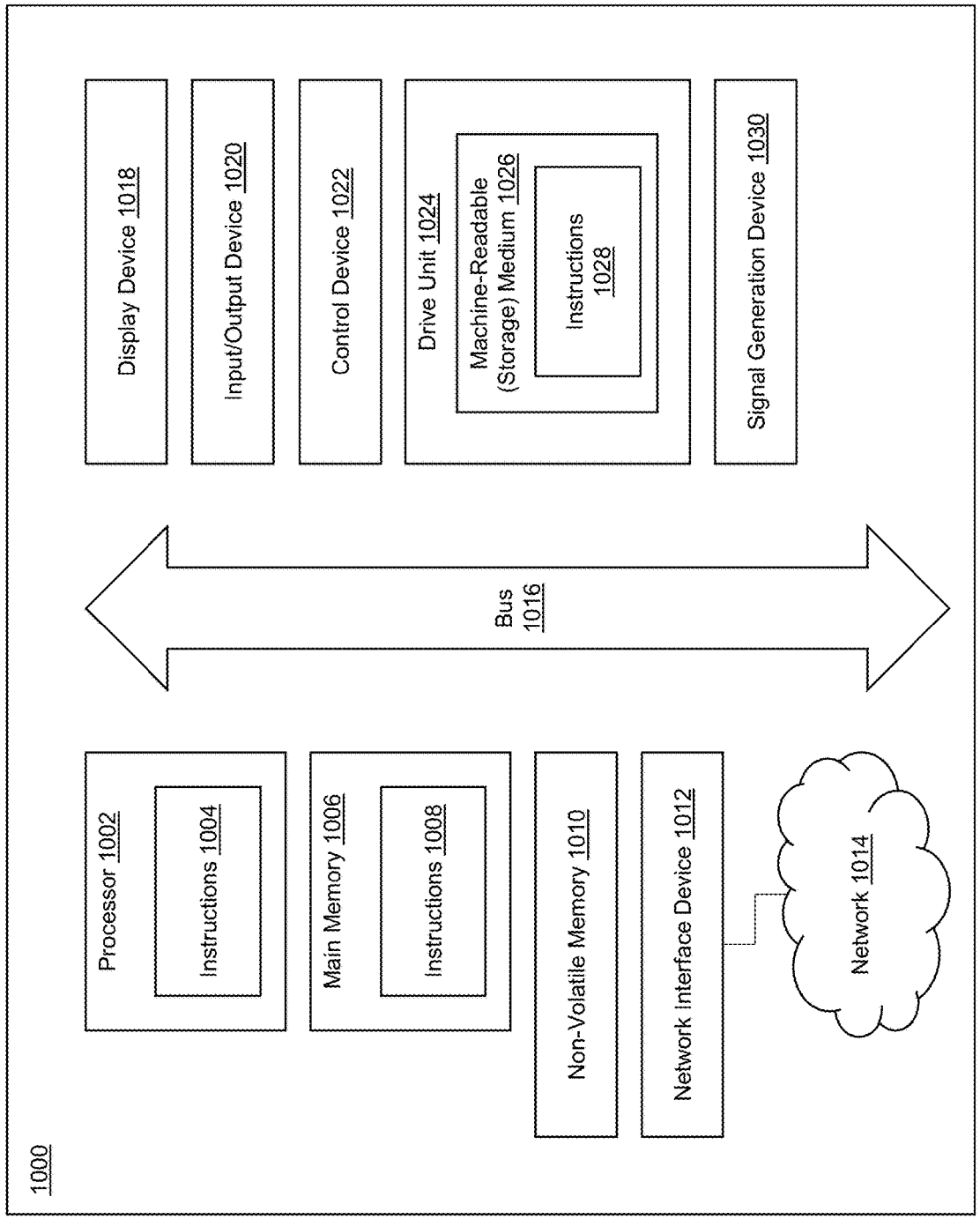
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a video display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementations, the computer system 1000 can be an embedded computer system, a system-on-chip (SOC), a single-board computer system (SBC), or a distributed system such as a mesh of computer systems, or it can include one or more cloud components in one or more networks. Where appropriate, one or more computer systems 1000 can perform operations in real time, in near real time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a computer system, cause the computer system to:
   receive, via a user interface displayed at a user device, a query, wherein the query comprises natural language;
   parse and translate, by the computer system, the natural language query into a graph traversal or database query operation;
   perform, by the computer system, the graph traversal or database query operation on a graph database to identify one or more graph representations,
      wherein the graph database comprises a plurality of graph representations defined by a graph schema, wherein each graph representation of the plurality of graph representations comprises:
         a plurality of nodes, each node representing an entity;
         a plurality of edges, each edge connecting at least two nodes and defining a relationship between at least two entities represented by the at least two nodes; and
         a plurality of properties, each property defining an attribute of one or more entities or one or more relationships;
      and wherein each graph representation of the plurality of graph representations is derived from a plurality of extracted data points, each extracted data point comprising at least one of: structured data, unstructured data, or time series data, wherein each extracted data point comprising unstructured data is assigned, using one or more machine learning models, to one or more of a plurality of categories based at least in part on a relationship between each extracted data point and at least one other extracted data point, wherein each extracted categorized data point comprising unstructured data is assigned to a cluster of a plurality of clusters based at least in part on a relationship of each extracted categorized data point to a characteristic of a source of the unstructured data, and wherein the assignment of categories and clusters to each extracted data point comprising unstructured data alters a structured data schema used to extract the structured data;
   retrieve, by the computer system, the one or more graph representations of the plurality of graph representations;
   score, by the computer system, the one or more graph representations based on a relevance of the one or more graph representations to the natural language query to identify at least one relevant graph representation;
   generate, by the computer system, a response to the natural language query, wherein generating the response comprises providing the at least one relevant graph representation to a large language model (LLM), and wherein the response comprises:
      natural language;
      a visual representation of the graph traversal;
      an indicator of one or more nodes of the plurality of nodes and one or more edges of the plurality of edges within the visual representation, wherein the one or more nodes and one or more edges are determined to be relevant to the query; and
      a structured citation comprising metadata indicating a source associated with the one or more nodes and one or more edges; and
   display, by the user the user interface on the user device, the response to the natural language query.

2. A computer system comprising:
   at least one hardware processor; and
   at least one non-transitory memory storing instructions, which, when executed by the at least one hardware processor, cause the computer system to:
   receive, via a user interface displayed at a user device, a query, wherein the query comprises natural language;
   parse and translate, by the computer system, the natural language query into a graph traversal or database query operation;
   perform, by the computer system, the graph traversal or database query operation on a graph database to identify one or more graph representations, wherein the graph database comprises a plurality of graph representations defined by a graph schema, wherein each graph representation of the plurality of graph representations comprises:
      a plurality of nodes, each node representing an entity;
      a plurality of edges, each edge connecting at least two nodes and defining a relationship between at least two entities represented by the at least two nodes; and
      a plurality of properties, each property defining an attribute of one or more entities or one or more relationships;
   and wherein each graph representation of the plurality of graph representations is derived from a plurality of extracted data points, each extracted data point comprising at least one of structured data, unstructured data, or time series data, wherein each extracted data point comprising unstructured data is assigned, using one or more machine learning models, to one or more of a plurality of categories based at least in part on a relationship between each extracted data point and at least one other extracted data point, wherein each extracted categorized data point comprising unstructured data is assigned to a cluster of a plurality of clusters based at least in part on a relationship of each extracted categorized data point to a characteristic of a source of the unstructured data, and wherein the assignment of categories and clusters to each extracted data point comprising unstructured data alters a structured data schema used to extract the structured data;
   retrieving, by the computer system, the one or more graph representations of the plurality of graph representations;

scoring, by the computer system, the one or more graph representations based on a relevance of the one or more graph representations to the natural language query to identify at least one relevant graph representation;

generating, by the computer system, a response to the natural language query, wherein generating the response comprises providing the at least one relevant graph representation to a large language model (LLM), and wherein the response comprises:

normal language;

a visual representation of the graph traversal;

an indicator of one or more nodes of the plurality of nodes and one or more edges of the plurality of edges within the visual representation, wherein the one or more nodes and one or edges are determined to be relevant to the query; and a structured citation comprising metadata indicating a source associated with the one or more nodes and one or more edges; and displaying, by the user the user interface on the user device, the response to the natural language query.

3. A computer implemented method for query response, the method comprising:

receiving, via a user interface displayed at a user device, a query, wherein the query comprises natural language;

parsing and translating, by a computer system, the natural language query into a graph traversal or database query operation;

performing, by the computer system, the graph traversal or database query operation on a graph database to identify one or more graph representations, wherein the graph database comprises a plurality of graph representations defined by a graph schema, wherein each graph representation of the plurality of graph representations comprises:

a plurality of nodes, each node representing an entity;

a plurality of edges, each edge connecting at least two nodes and defining a relationship between at least two entities represented by the at least two nodes; and a plurality of properties, each property defining an attribute of one or more entities or one or more relationships;

and wherein each graph representation of the plurality of graph representations is derived from a plurality of extracted data points, each extracted data point comprising at least one of structured data, unstructured data, or time series data, wherein each extracted data point comprising unstructured data is assigned, using one or more machine learning models, to one or more of a plurality of categories based at least in part on a relationship between each extracted data point and at least one other extracted data point, wherein each extracted categorized data point comprising unstructured data is assigned to a cluster of a plurality of clusters based at least in part on a relationship of each extracted categorized data point to a characteristic of a source of the unstructured data, and wherein the assignment of categories and clusters to each extracted data point comprising unstructured data alters a structured data schema used to extract the structured data;

retrieving, by the computer system, the one or more graph representations of the plurality of graph representations;

scoring, by the computer system, the one or more graph representations based on a relevance of the one or more graph representations to the natural language query to identify at least one relevant graph representation;

generating, by the computer system, a response to the natural language query, wherein generating the response comprises providing the at least one relevant graph representation to a large language model (LLM), and wherein the response comprises:

natural language;

a visual representation of the graph traversal;

an indicator of one or more nodes of the plurality of nodes and one or more edges of the plurality of edges within the visual representation, wherein the one or more nodes and one or edges are determined to be relevant to the query; and a structured citation comprising metadata indicating a source associated with the one or more nodes and one or more edges; and displaying, by the user the user interface on the user device, the response to the natural language query.

4. The method of claim 3, wherein the graph database comprises a Neo4j, ArangoDB, or Amazon Neptune database, or wherein the graph database comprises a representation layer configured to interface with a relational database management system (RDBMS).

5. The method of claim 3, wherein the unstructured data is ingested into the graph database by:

receiving, from a data source, one or more documents;

extracting text from the one or more documents;

extracting data from the extracted text using one or more large language models (LLMs), wherein the one or more LLMs are prompted to extract the data according to a predefined schema;

transforming the extracted data into a graph representation according to the graph schema;

storing the graph representation in the graph database.

6. The method of claim 5, wherein the one or more documents comprise PDF files, plain text documents, rich text format (RTF) files, word documents, and/or image files containing text.

7. The method of claim 3, wherein the structured data is ingested into the graph database by:

receiving, from a data source, one or more tabular data stores;

mapping the one or more tabular data stores to a graph representation using the graph schema, wherein the mapping comprises:

manually and/or automatically mapping a column of the one or more tabular data stores to a node of the plurality of nodes, an edge of the plurality of edges, or a property of the plurality of properties; and storing the graph representation in the graph database.

8. The method of claim 3, wherein the time series data is ingested into the graph database by:

receiving, from a data source, one or more temporal data sequences;

parsing and standardizing the one or more temporal data sequences to a common format;

detecting and correcting one or more missing data points within the one or temporal data sequences;

generating a graph representation of the one or more temporal data sequences using the graph schema;

storing the graph representation in the graph database and storing the one or more temporal data sequences in a storage location, wherein the graph representation comprises a reference to the storage location or a link to the one or more temporal data sequences.

9. The method of claim 8, wherein the data source comprises a comma separated value (CSV) file with timestamp columns, a Javascript object notation (JSON) formatted time series, a specialized time series database, or a real-time data stream.

10. The method of claim 3, wherein an edge of the plurality of edges defines a temporal relationship between the at least two entities represented by the at least two nodes, wherein the at least two nodes comprise time series nodes, and wherein the at least two entities comprise entities derived from the structured data or the unstructured data.

11. The method of claim 10, wherein the temporal relationship is continuously updated based on one or more temporal data sequences received from a real-time data stream.

12. The method of claim 3, wherein parsing and translating the natural language query into a graph traversal or database query operation comprises mapping the natural language query to a data category of the graph database and/or one or more nodes of the plurality of nodes.

13. The method of claim 3, wherein parsing and translating the natural language query into a graph traversal or database query operation comprises:
generating an embedding for the natural language query using an embedding algorithm or a domain-specific embedding model; and
comparing the generated embedding to a pre-computed embedding associated with the unstructured data, structured data, or time series data using a similarity measure.

14. The method of claim 3, wherein parsing and translating the natural language query into a graph traversal or database query operation comprises matching the natural language query to summaries of the structured data, unstructured data, and time series data based on embedding similarity.

15. The method of claim 3, wherein scoring the one or more graph representations based on relevance comprises a combination of factors comprising category match strength, embedding similarity, and graph structural importance metrics.

16. The method of claim 3, further comprising assigning, by the computer system, a confidence score to a plurality of parts of the generated response based on one or more factors including: data source reliability, consistency with multiple sources, and LLM confidence metrics.

17. The method of claim 3, wherein providing the set of relevant graph representations to the LLM comprises:
formatting the set of relevant graph representations into a context document; and
providing the context document to the LLM.

18. The method of claim 3, wherein each node representing an entity is linked to each node representing a same entity across the plurality of graph representations derived from at least one of the structured data, the unstructured data, and the time series data.

19. The method of claim 3, wherein the graph schema is configured to automatically adjust, using machine learning, to include new types of nodes, edges, and/or properties.

* * * * *

UNITED STATES PATENT AND TRADEMARK OFFICE
CERTIFICATE OF CORRECTION

PATENT NO. : 12,339,839 B2
APPLICATION NO. : 18/935017
DATED : June 24, 2025
INVENTOR(S) : Michael August Verkruyse et al.

It is certified that error appears in the above-identified patent and that said Letters Patent is hereby corrected as shown below:

On the Title Page

Column 2, Line 1 (item (74) Attorney, Agent, or Firm), delete "Cole" and insert -- Coie -- therefor.
On Page 2, Column 1, Line 8 (Other Publications), delete "Auto Encoder," and insert
-- AutoEncoder, -- therefor.

In the Specification

In Column 8, Line 27, delete "that that" and insert -- that -- therefor.
In Column 11, Line 4, delete "information," and insert -- information. -- therefor.
In Column 15, Line 29, delete "nodecan" and insert -- node can -- therefor.
In Column 25, Line 46, delete "(Saas)" and insert -- (SaaS) -- therefor.
In Column 27, Line 66, delete "trail to" and insert -- trail -- therefor.
In Column 27, Line 67, after "relationships" insert -- to -- therefor.
In Column 31, Lines 21-51, delete "disclosed system operates. In various embodiments, these computer systems, and other devices 800 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit (CPU) 801 for executing computer programs; a computer memory 802 for storing programs and data while they are being used, including the facility and associated data, an operating system including a kernel, and device drivers; a persistent storage device 803, such as a hard drive or flash drive for persistently storing programs and data; computer-readable media drives 804 that are tangible storage means that do not include a transitory, propagating signal, such as a floppy, CD-ROM, or DVD drive, for reading programs and data stored on a computer-readable medium; and a network connection 805 for connecting the computer system to other computer systems to send and/or receive data, such as via the Internet or another network and its networking hardware, such as switches, routers, repeaters, electrical cables and optical fibers, light emitters and receivers, radio transmitters and receivers, and Signed and Sealed this
Tenth Day of February, 2026

John A. Squires
*Director of the United States Patent and Trademark Office* the like. While computer systems configured as described above are typically used to support the operation of the facility, those skilled in the art will appreciate that the facility may be implemented using devices of various types and configurations and having various components." and insert the same on Column 31, Line 20, as a continuation of the same paragraph.